United States Patent
Schuster, Sr. et al.

(10) Patent No.: US 6,254,187 B1
(45) Date of Patent: *Jul. 3, 2001

(54) ARCHING MECHANISM

(75) Inventors: Wilhelm Schuster, Sr., Linz; Wilhelm Schuster, Jr., Gallneukirchen, both of (AT)

(73) Assignee: Schukra-Geratebau GesmbH (AT)

( * ) Notice: Subject to any disclaimer, the term of this patent is extended or adjusted under 35 U.S.C. 154(b) by 0 days.

This patent is subject to a terminal disclaimer.

(21) Appl. No.: 09/382,260

(22) Filed: Aug. 24, 1999

Related U.S. Application Data

(62) Continuation of application No. 09/110,836, filed on Jul. 6, 1998, now Pat. No. 6,003,941, which is a continuation of application No. 08/778,965, filed on Jan. 6, 1997, now Pat. No. 5,775,773, which is a division of application No. 08/488,117, filed on Jun. 7, 1995, now Pat. No. 5,626,390, which is a division of application No. 08/352,374, filed on Dec. 8, 1994, now Pat. No. 5,498,063, which is a division of application No. 07/820,870, filed as application No. PCT/AT90/00078 on Aug. 6, 1990, now Pat. No. 5,397,164.

(30) Foreign Application Priority Data

| Aug. 4, 1989 | (AT) | ................................................ | 1882/89 |
| Sep. 12, 1989 | (AT) | ................................................ | 2133/89 |

(51) Int. Cl.[7] ................................................ A47C 3/025
(52) U.S. Cl. ................................ 297/284.1; 297/284.4
(58) Field of Search ................................ 297/284.1, 284.4, 297/284.2

(56) References Cited

U.S. PATENT DOCUMENTS

| 3,762,769 | 10/1973 | Poschl | 297/284 |
|---|---|---|---|
| 4,153,293 | 5/1979 | Sheldon | 297/284 |
| 4,316,631 | 2/1982 | Lenz et al. | 297/284.1 |
| 4,354,709 | 10/1982 | Schuster | 297/284.4 X |
| 4,601,514 | 7/1986 | Meiller | 297/284 |
| 4,627,661 | 12/1986 | Ronnhult et al. | 297/284.4 |
| 4,632,454 | 12/1986 | Naert | 297/284.4 |
| 4,880,271 | 11/1989 | Graves | 297/284.4 |
| 4,909,568 | 3/1990 | Dal Monte | 297/284.4 |
| 4,968,093 | 11/1990 | Dal Monte | 297/284.4 |
| 5,026,116 | 6/1991 | Dal Monte | 297/284.1 |
| 5,050,930 | 9/1991 | Schuster et al. | 297/284.4 |
| 5,197,780 | * 3/1993 | Coughlin | 297/284.4 X |
| 5,217,278 | * 6/1993 | Harrison et al. | 297/284.4 X |
| 5,385,531 | 1/1995 | Jover | 297/284.1 X |
| 5,397,164 | * 3/1995 | Schuster et al. | 297/284.1 |
| 5,498,063 | * 3/1996 | Schuster et al. | 297/284.1 |
| 5,626,390 | * 5/1997 | Schuster | 297/284.1 |
| 5,775,773 | * 7/1998 | Schuster et al. | 297/284.1 |

FOREIGN PATENT DOCUMENTS

| 2040794 | 7/1971 | (DE) | 297/284.4 |
|---|---|---|---|
| 2345254 | 4/1974 | (DE) | 297/284.4 |
| 2013487 | 8/1979 | (GB) | 297/284.4 |
| 2804703 | 8/1979 | (DE) | 297/284.4 |
| 587924 | 1/1978 | (SU) | 297/284.4 |

* cited by examiner

Primary Examiner—Jose V. Chen
(74) Attorney, Agent, or Firm—Howard & Howard

(57) ABSTRACT

Arching mechanism, for instance for backrests of seats, medical or orthopaedic apparatus or casings and the like, with a pressure element wherein at least one traction element connected with a tensioning mechanism engages, which, when the mechanism is actuated can produce bulging by preserving a relative elevation of apex of the convexity; the arching mechanism can comprise a frame with inserted pressure elements actuatable by adjusting device(s), whereby frame segments are length-variable pressure elements; traction elements provided with tensioning mechanism can engage a slitted, overlapping or bellows-like bulging body for the opening and closing of these areas, which produces a curving of the bulging body in a predetermined direction or directions.

8 Claims, 20 Drawing Sheets

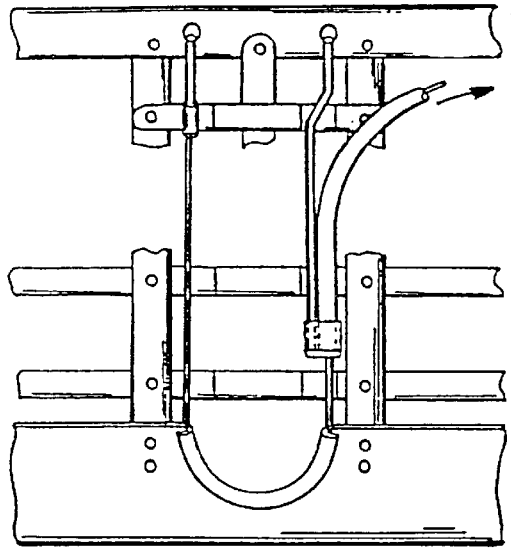
Fig- 6A
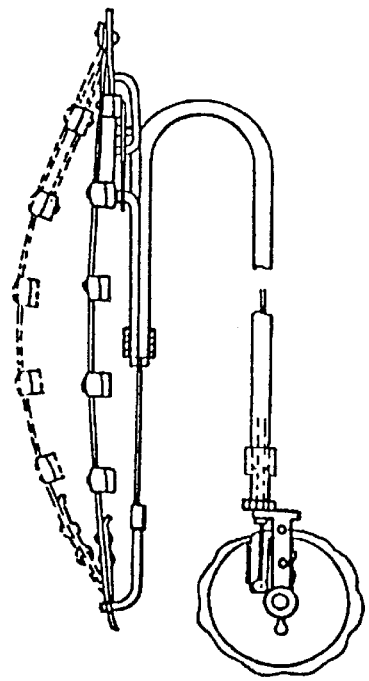
Fig- 5
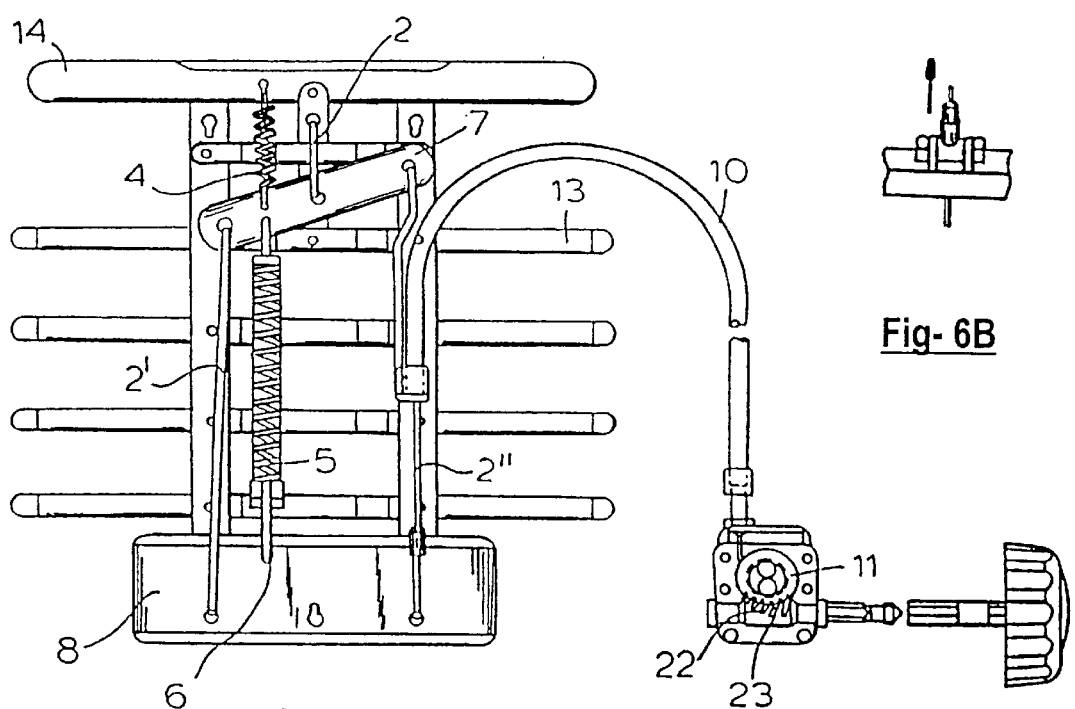
Fig- 6
Fig- 6B

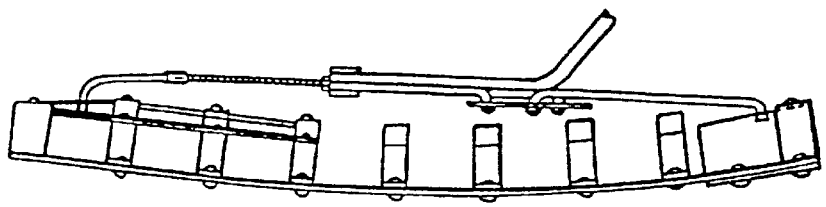
Fig. 7"
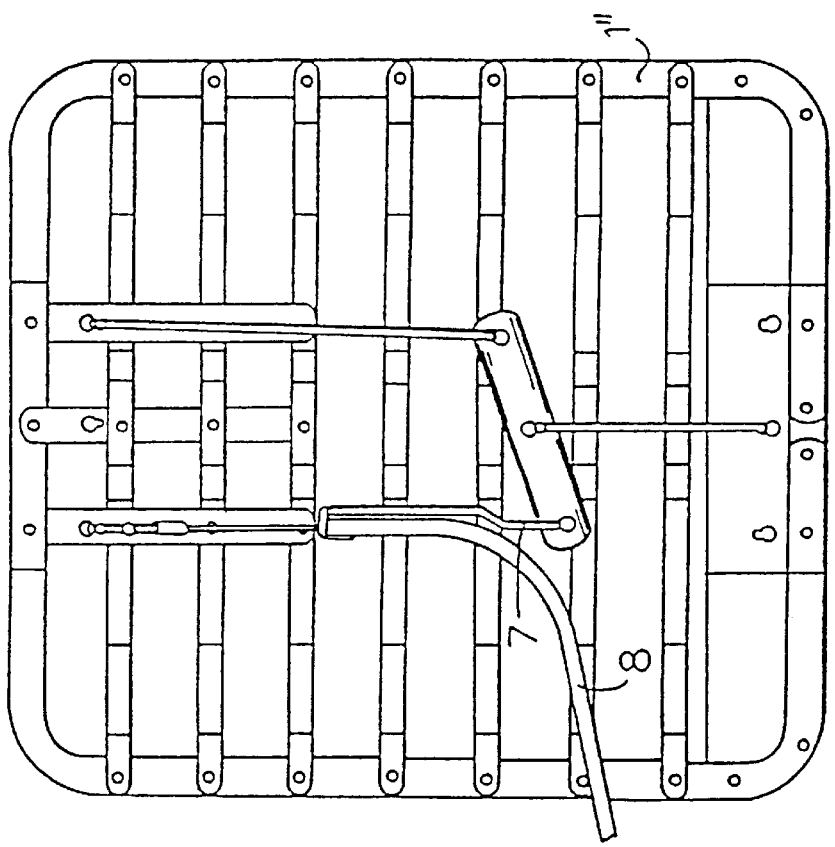
Fig. 7
Fig. 7'

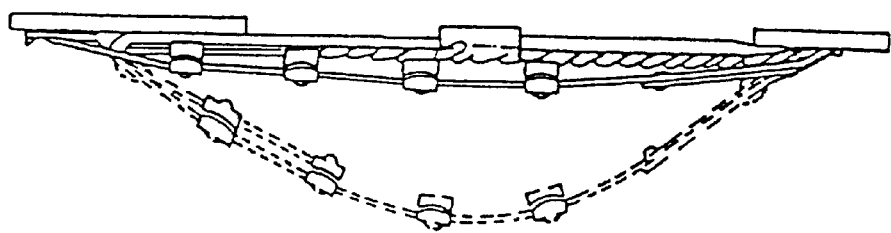
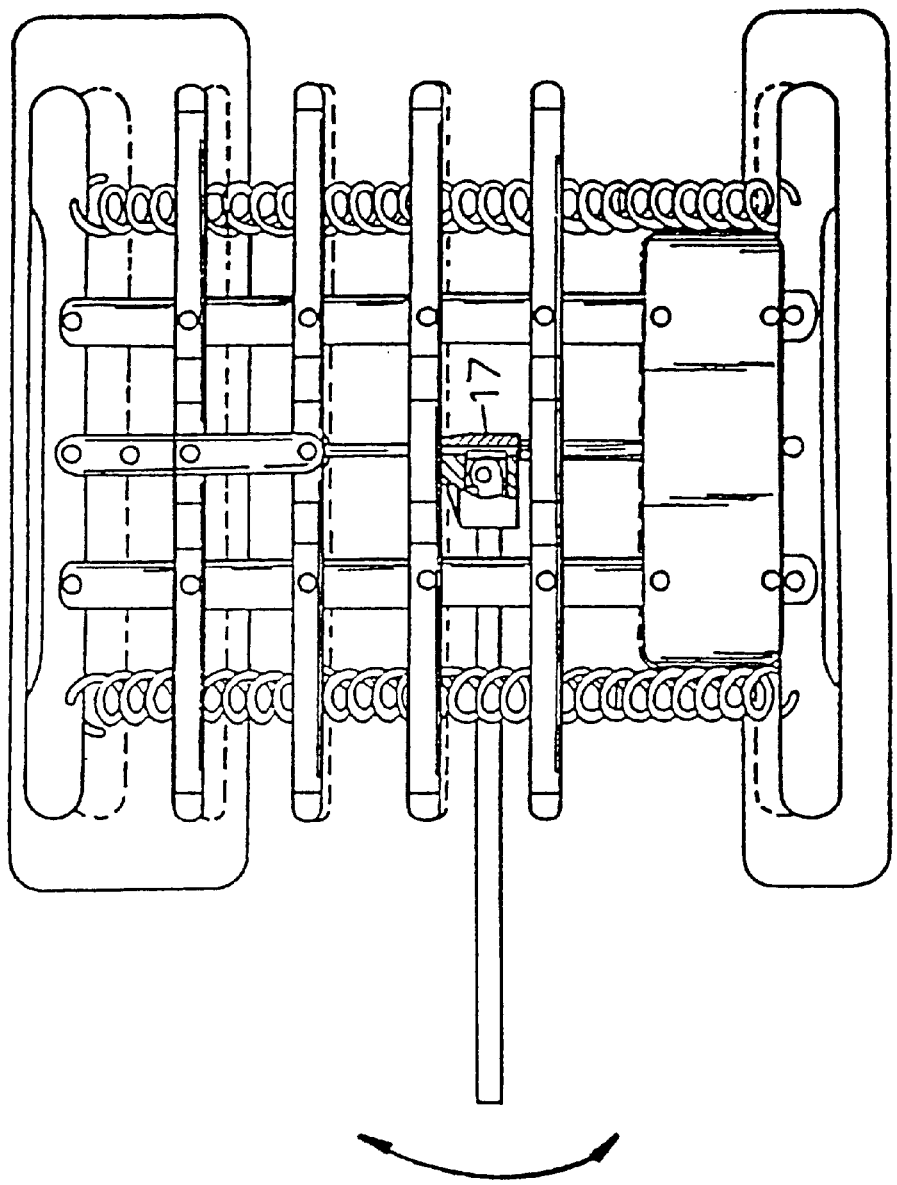
Fig- 8"
Fig- 8'

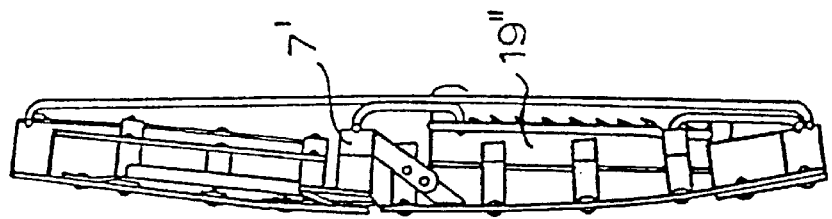
Fig- 10"
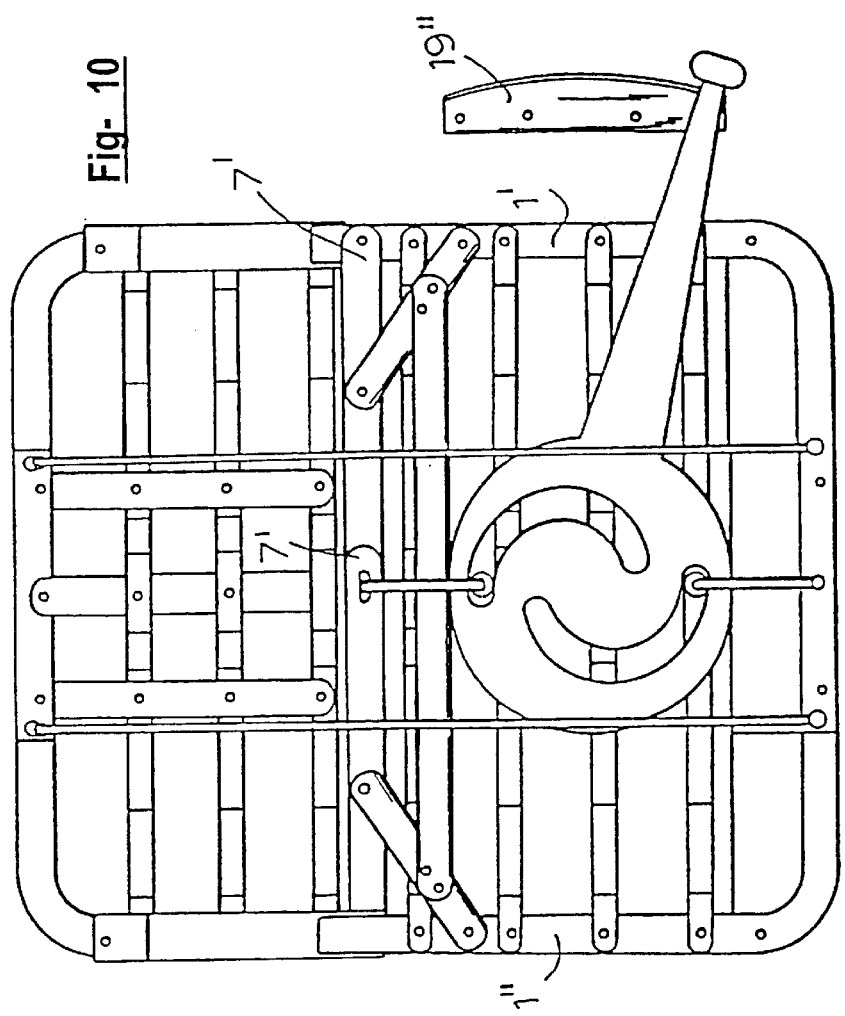
Fig- 10
Fig- 10'

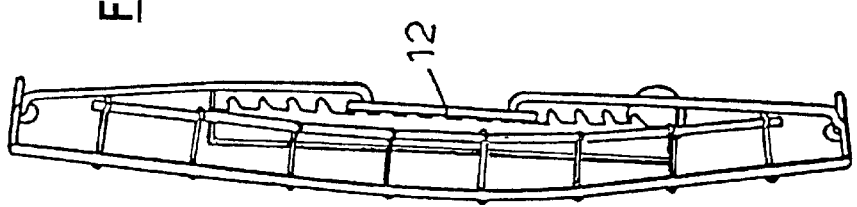
Fig- 11"
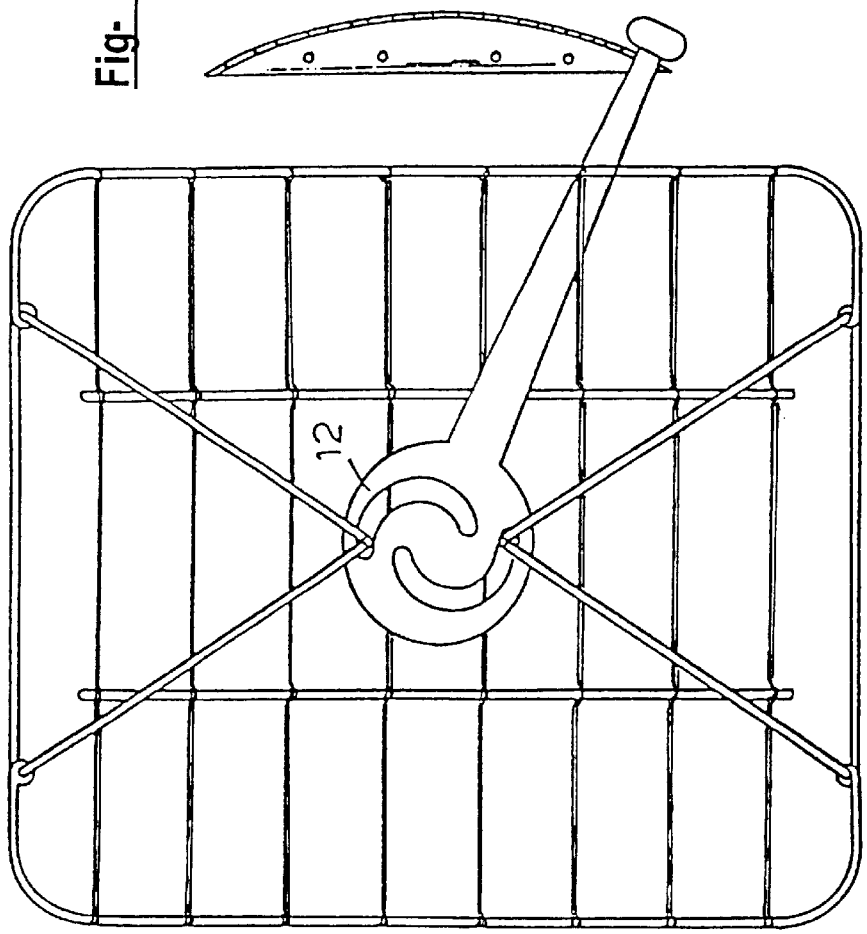
Fig- 11
Fig- 11'

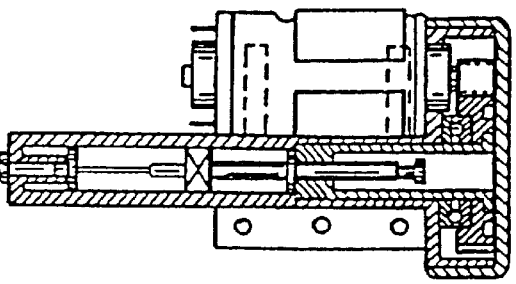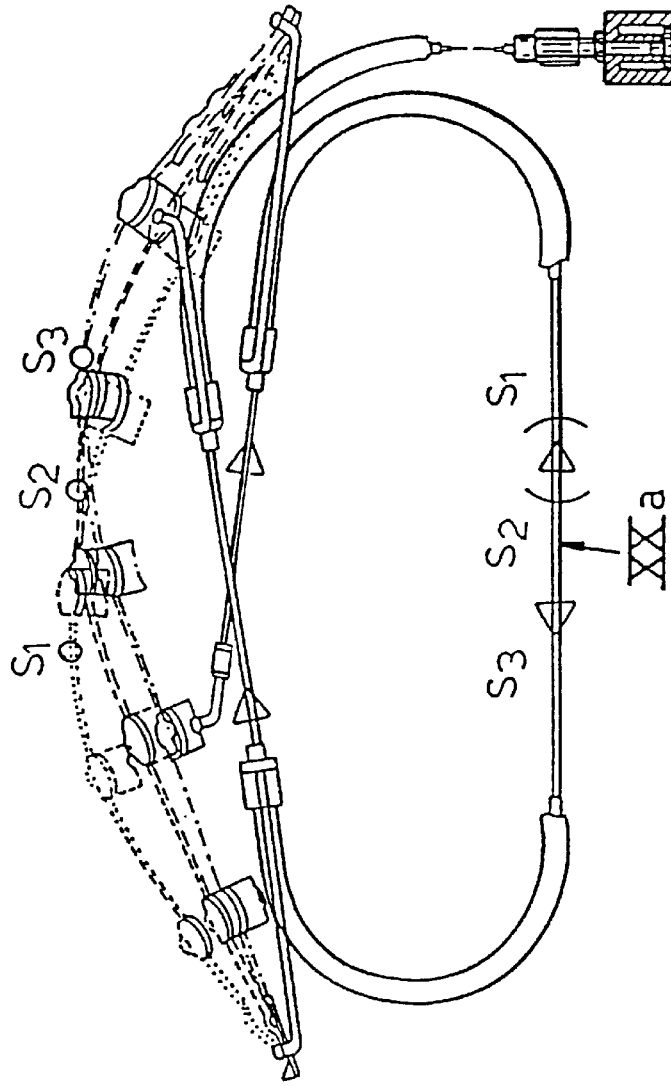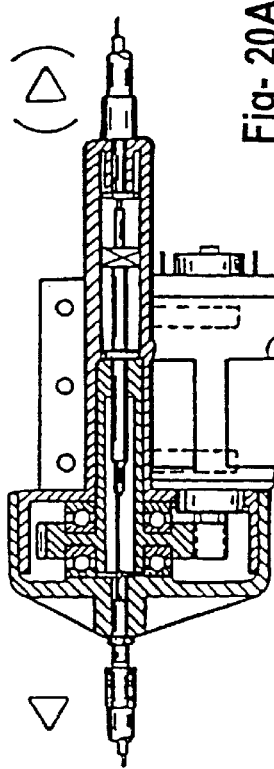
Fig- 20
Fig- 20A

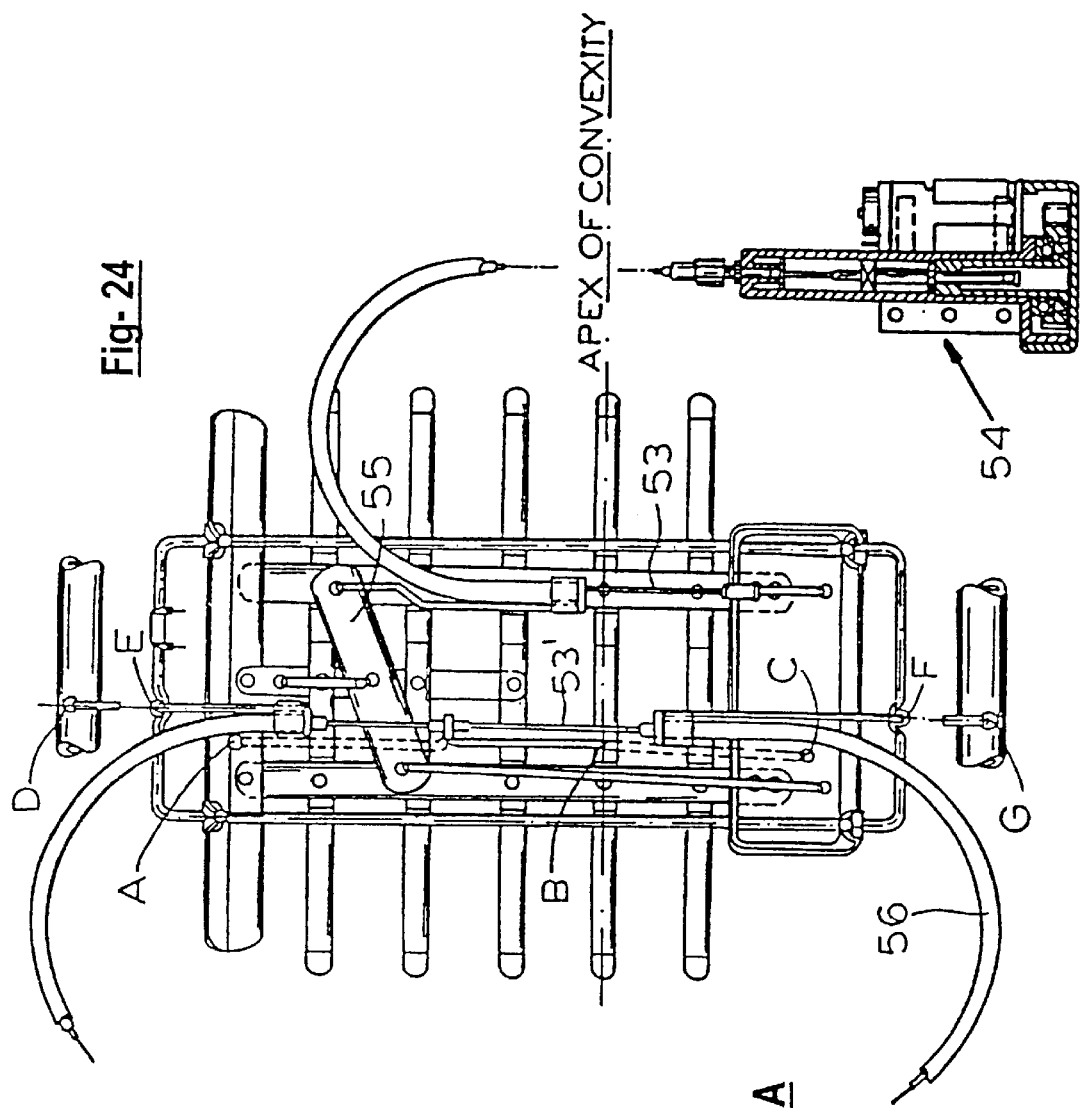

ARCHING MECHANISM

This application is a continuation of U.S. Ser. No. 09/110,836, filed Jul. 6, 1998, U.S. Pat. No. 6,003,941 which is a continuation of Ser. No. 08/778,965, filed Jan. 6, 1997, U.S. Pat. No. 5,775,773, which is a divisional of Ser. No. 08/488,117, filed Jun. 7, 1995, U.S. Pat. No. 5,626,390, which is a divisional of Ser. No. 08/352,374, filed Dec. 8, 1994, U.S. Pat. No. 5,498,063, which is a divisional of Ser. No. 07/820,870, filed Jan. 17, 1992, U.S. Pat. No. 5,397,164, which is a 371 of PCT/AT90/00078, filed Aug. 6, 1990.

The invention relates to an arching mechanism, particularly for a backrest for a vehicle seat or seats for office and home furniture, respectively seats of all kind, as well as for use particularly in medical or orthopaedic devices and apparatus, such as corsets or arch supports, in scaffoldings or casings, for the production of hulls, etc.

When for instance the arching of a backrest is adjusted, usually the apex of its convexity wanders according to the construction type of the arching mechanism over the height of the backrest, always remaining the same. It does not adjust sufficiently to the constantly changing curvature of a more or less curved spinal column, or to a stretching of the spinal column which is medically recommended or desired by the user. In constructions with shell seats, usually the lateral support diminishes with increased arching.

The EU-B-37656 shows a restraining frame for a motor vehicle seat, wherein a support piece is suspended by springs. The support piece consists of two lateral parts connected to the frame by springs and mutually connected by cross elements. There is a centrally located adjusting shaft which can be actuated by a hand wheel, the shaft running through so-called engagement devices, which in turn are connected to the outermost points of the lateral parts via flexible connection elements. When the hand wheel is turned, an arching of the support part is supposed to result, whereby basically in the beginning only an expansion of the springs occurs. This type of construction affords support to only a few vertebrae; the vertebrae lying above and below do not get the same strong support. A freely suspended insertion of the support part in the backrest or a construction wherein the support is suspended in the upholstery is not possible.

The DE-OS 2804703 shows a backrest wherein a plate having straps arranged oppositely to each other can be arched via mutually engaged guide rails. The entire plate is height-adjustable by means of a rocker lever.

The EU-A1-322535 shows a backrest with an upper and a lower support strap which are interconnected by a vertical, flexible strap and a spring tensioned between them, whereby an adjusting shaft engages via a gear in the lower support strap, in order to achieve an arching of the backrest by bending the flexible strap.

Further, backrests made of foam material are known, which are supposed to adjust to the shape of the spinal column.

Another example is shown by DE-OS 3440846 which discloses an automobile seat whose backrest comprises a frame and a plate received in the frame. The plate is provided with vertically extending lognitudinal slits in which a lumbar-support device is movable. The lumbar support can be adjusted by a hand wheel through a shaft linked onto the frame to vary its stiffness and to move it vertically.

The lumbar support is directly connected with the frame. As a result, all vibrations imparted by the road to the vehicle are fully transmitted to the back of the driver.

The known mechanisms do not permit any accommodation to changed or changing curvatures of the spinal column. For instance, during long car trips, the curvature of the spinal column alters greatly as a result of the required holding work, when the total weight of the upper body must be supported based on this disadvantageous position (hand stretched out towards the steering wheel). This muscle work, respectively holding work in order to keep the body upright under conditions or improper or insufficient support has to be performed entirely by the musculature and the skeletal system, and thus logically leads to considerable exhaustion, as well as muscle stress. The involved muscles require for this work up to 40 times more blood, respectively 40 times more energy, compared to an anatomically supported upper body (whose muscles do not have to perform any holding work).

The support, respectively holding work must be performed by the arching mechanism and namely for all spinal columns (whose curvatures are as varied as human faces— and which in addition, are constantly altered from hour to hour due to tiredness, exertion and the required holding work—the height of a person decreases from morning to evening be approximately 2 to 4 cm, and the spinal curvature changes in this time period by up to 10 cm). Thus, an optimal arching mechanism has to act in a differentiated manner so that for instance when used in a backrest, it can suitably support any shape of back, i.e. at least threefold and with variable strength, as follows: 1. very strongly and stably in forward direction in the pelvic area (against the backward tilting of the pelvis), 2. somewhat gentler but equally firm radially and vertically in order to support each vertebra in the lower-back (lordosis) area and 3. essentially stronger and vertically in an upward direction in the pectoral area under the shoulders against the weight of the upper body. The additional support for the neck area can be a further requirement.

Once the arch is set and adjusted to the shape of the spinal column, it is naturally not allowed to change its shape even under fully exerted pressure, in order to insure full support independently from the momentary curvature of the spinal column of the user.

The at least triple support required from an ergonomically optical backrest can not be offered at all or only insufficiently by the known devices.

It is therefore the object of the present invention to avoid the above-mentioned drawbacks and to create an ergonomically curvable and height-adjustable arching mechanism with a wide spectrum of application and which, when used as a lordosis support insures a multiple, at least a triple support.

The object of the invention is attained due to the fact that in its upper and/or lower region, a general pressure element engages at least one traction element connected with a tension element or a pressure mechanism, and that when the tension device or the pressure mechanism is actuated, the curvature caused by the mechanism occurs so that the apex of its convexity is maintained or is displaced with respect to its relative elevation.

The relative position of the apex of convexity is thereby considered either with reference to the used frame, or a seat or even the apex of the lordosis of the person, i.e. when the person moves in the seat thereby altering the lordosis, the apex of the convexity of the mechanism has still to remain always adjusted to the lordosis.

Another embodiment of the invention comprises a frame and therein inserted pressure elements actuatable by at least one adjustment device, preferably pressure strips or surfaces, and the vertically running segments of the frame are length-variable over at least one adjustment device.

In a further embodiment variant of the invention, the arching mechanism comprises an arching body, which is slitted, overlapping or shaped like bellows and at least at these points traction elements provided with one or several tension mechanisms engage for closing, respectively opening of these areas, whereby a curving of the arching body in each desired, preestablished direction can be achieved.

Further features of the invention can be understood from the dependent claims, the specification and the attached drawing.

BRIEF DESCRIPTION OF THE DRAWINGS

The above and other objects, features, and advantages will become more readily apparent from the following description, reference being made to the accompanying drawings in which.

FIG. 5 is a side elevational view of the mechanism of FIG. 4 showing the bulged state in broken line;

FIG. 6 is a view of still another embodiment of the invention similar to FIG. 4;

FIGS. 6a, 6b are fragmentary elevational views showing another arrangement of the cable of the embodiment otherwise shown in FIG. 6;

FIG. 7 is an elevational view of yet another embodiment of the invention;

FIG. 7' is an end view of the embodiment of FIG. 7;

FIG. 7" is a side view of this embodiment;

FIGS. 8', 8" are elevational views of yet a further embodiment of the invention;

FIG. 8c' is a side view of FIG. 8c with the bowed state being showed in broken lines;

FIG. 10 is an elevational view of yet another embodiment utilizing an eccentric drive for the bowing mechanism;

FIG. 10' is an end view of the embodiment of FIG. 10.

FIG. 10" is a side view of the embodiment of FIG. 10.

FIG. 11 is an elevational view of still another embodiment of the invention, also using an eccentric to control the bowing of the frame;

FIG. 11' is an end view of the embodiment of FIG. 11;

FIG. 11" is a side view of the embodiment of FIG. 11;

FIG. 12b is an elevational view of the embodiment of FIG. 12a;

FIGS. 17, 17a are elevational views of yet a further embodiment of the invention;

FIG. 17' is an end view of this latter embodiment;

FIG. 17" is a side view of the embodiment of FIG. 17;

[FIG. 17'" is a detail view of another cable connection;]

FIGS. 20, 20a are elevational views, partly broken away, of the mechanism for applying tension to a cable as used in the invention;

FIGS. 24, 24a are reviews similar to FIG. 21 but illustrating yet another embodiment.

In FIG. 1, two vertically running and mutually spaced apart pressure rods 1, 1' are connected by transverse ribs 13, 13', running perpendicularly thereto. The upper end of the row of transverse ribs forms an end strip or slide strip 14, the lower end is formed by a support plate for the pelvic edge. The end strip 14, as well as the support plate 8 is provided on its outer edges with bores, wherein springs 16, 16' are suspended, which again engage in a frame of the backrest, not shown in the drawing. In between and parallelly to the two pressure rods 1, 1', starting from the end strip 14 down to the middle area of the arching mechanism, runs a locking or traction-assisting strap 9 in whose upper region a rod-like traction element 2, e.g. for instance a bicycle spoke, is suspended. A' is the upper application point of the traction force. A further traction element 2' is suspended in the support plate 8 at B, which forms the lower application point of the traction force. The two traction elements 2, 2' are further connected with a tension lock 3, arranged in the central area of the arching mechanism, which can be actuated via a hand wheel fastened to the end of a shaft protruding from the arching mechanism.

When the hand wheel is turned, the mechanism starts to bulge, since both traction elements (2, 2') are pulled together.

Figure 3:
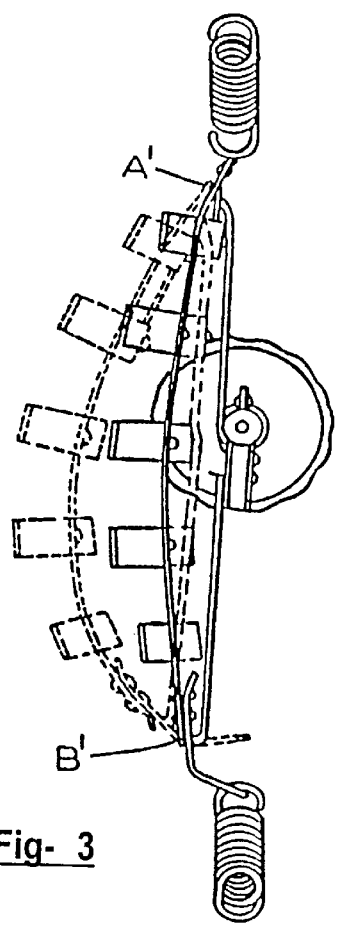
FIG. 3 is a side elevational view of a mechanism of FIG. 1 showing the bulging thereof in broken line.

FIG. 3 shows the path (h) between X1 and X2 travelled by the apex of the convexity not dislocated from its original plane, during the arching of the mechanism.

Figure 2A:
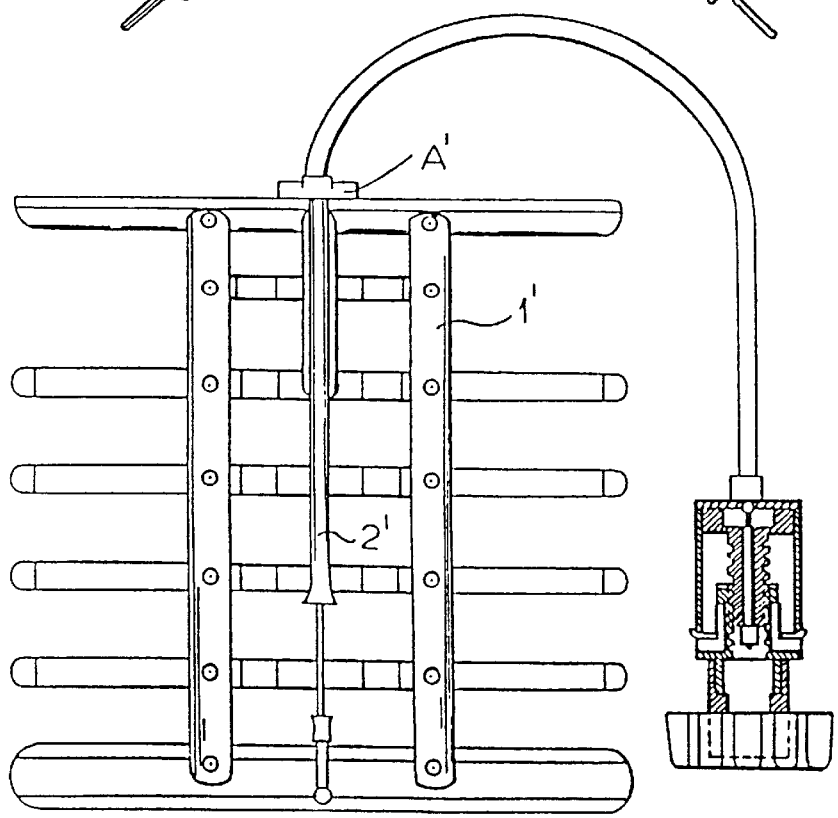
FIG. 2a is an elevational view of another mechanism for this purpose.
Figure 2B:
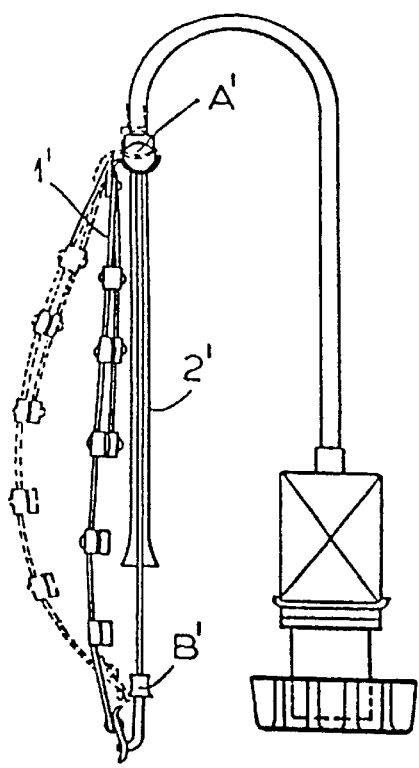
FIG. 2b is a side elevation view of the mechanism for FIG. 2a but showing a bulging thereof in broken line.

In the embodiment of FIG. 2, the tension device is a bowden wire 10, whereby the traction element is a wire running in a sleeve. The upper and lower application points of the tension device on the arching body are again marked A' and B'.

Figure 4:
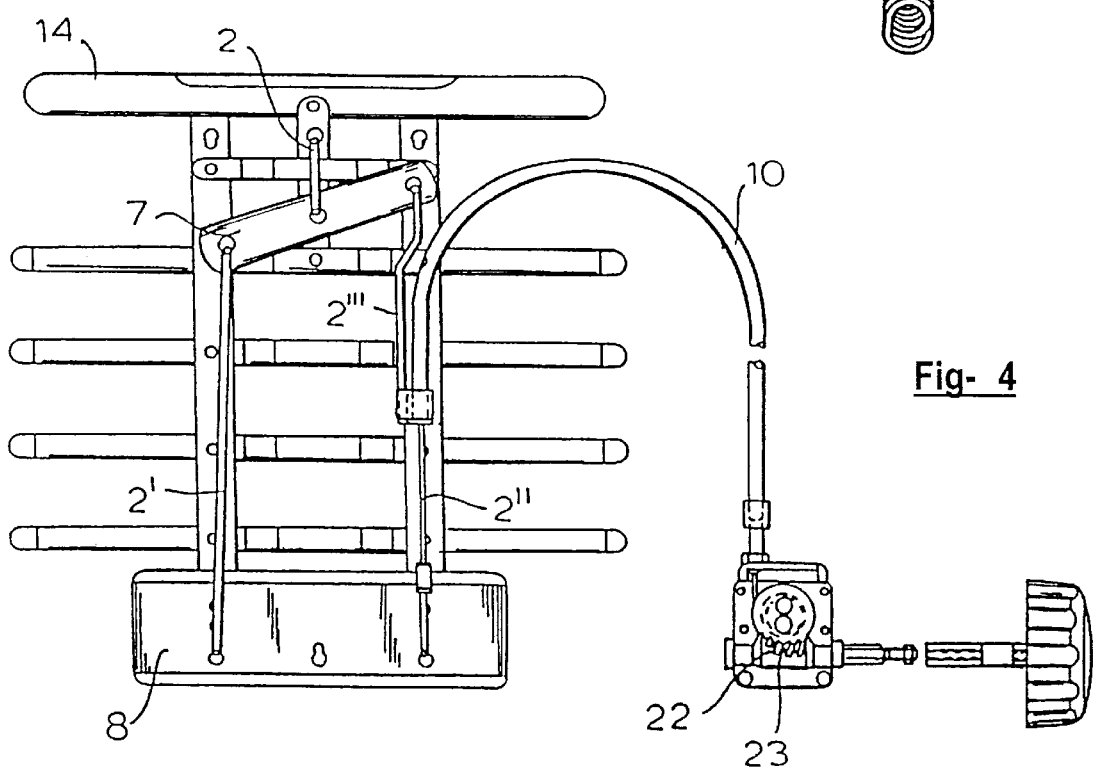
FIG. 4 is a view similar to FIG. 2a of still another mechanism according to the invention.
Figure 8B:
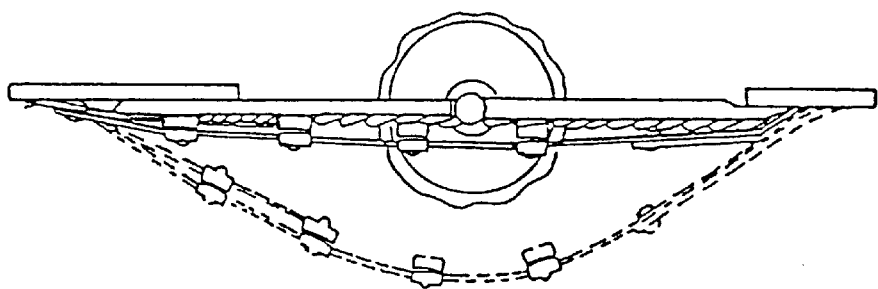
FIG. 8b is a side view of the embodiment of FIG. 8a, a bulging or bowed configuration being represented in broken lines.
Figure 8A:
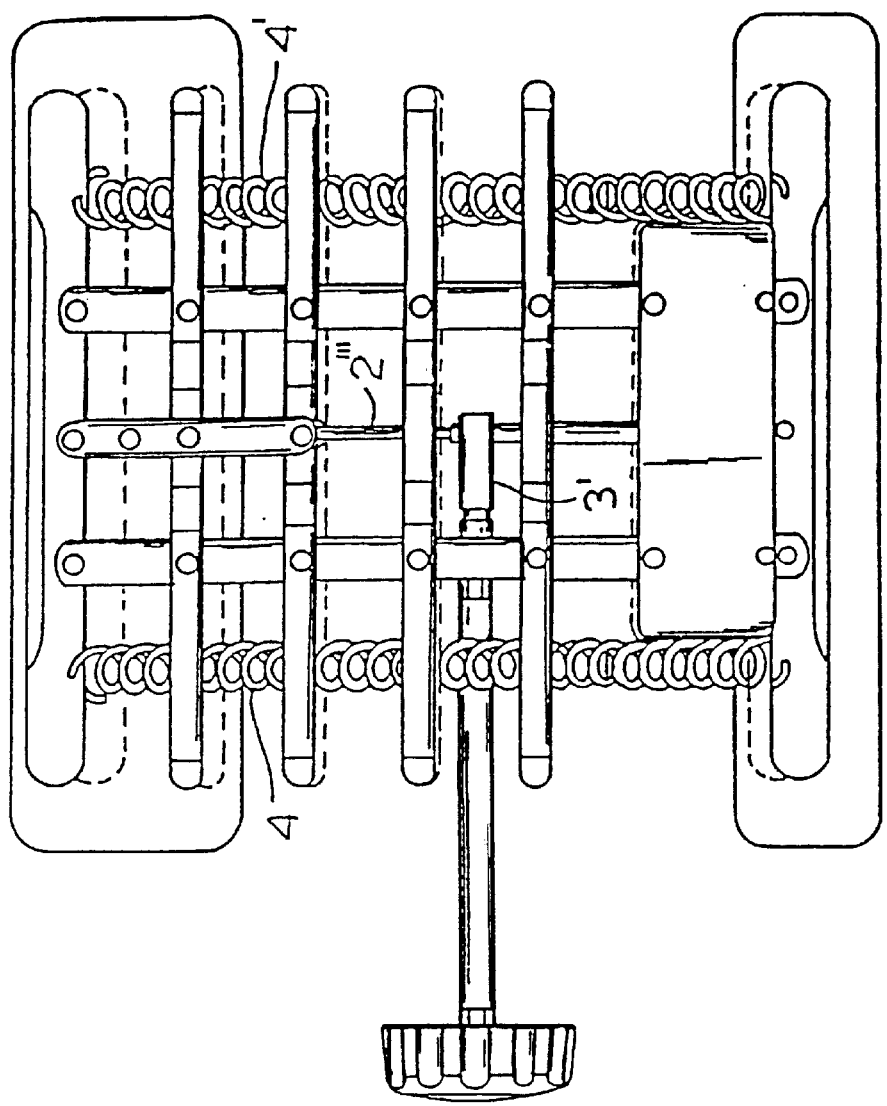
FIG. 8a is an elevational view; partly broken away of an embodiment similar to FIG. 8', showing a different handle arrangement.
Figure 8C:
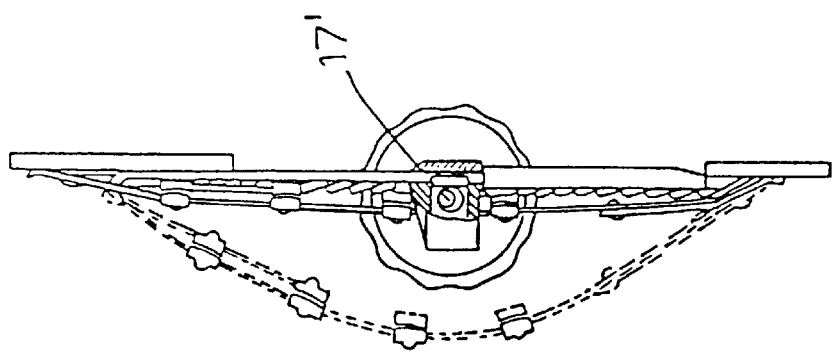
FIG. 8c is a view similar to FIG. 8a with a slight modification of the structure thereof.
Figure 8C:
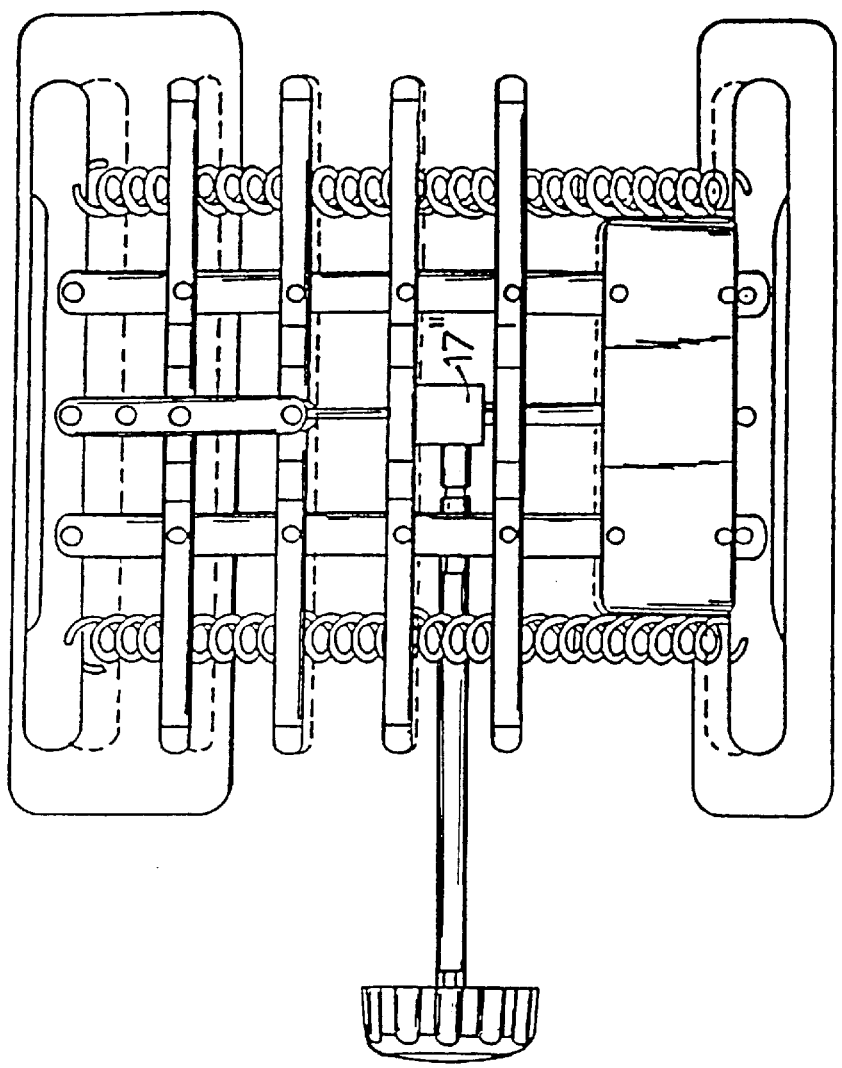

In the embodiment according to FIG. 4, the tension device is also a bowden wire 10. The traction element 2" slidable within its sleeve by means of a screw drive, respectively a worm gearing 22, 23, is a wire, respectively a bowden wire, engaging at the right side of the support plate 8. In the area where the wire exists the sleeve, the latter is connected with a further traction element. This traction element is a rod 2"', which is linked to the right-side area of a lever 7, which again is connected via a short traction element with the locking-assisting strap. From the left edge of the lever 7, a traction rod leads to the left area of the support plate 8. Due to this construction of the tension device, it is again possible to achieve a bulging of the entire mechanism by keeping the apex of the convexity in place, since at the actuation of the wire line, the traction rod running outside on the left is entrained.

The embodiment shown in FIG. 6 is essentially based on the one shown in FIG. 4, but between the lever 7 and the end strip also a traction spring 4 is provided and in the extension of this spring, between the lever 7 and the support plate 8 a compression spring 5 is provided, whereby between the compression spring 5 and the support plate 8 a tightening set screw 6 is provided.

The function of the lever can be taken over by a guide groove provided in the support plate 8, whereby the traction element designed as a wire coming from the sleeve of the bowden wire runs over the groove, is redirected and runs up to the end strip, where it has a fixed end (FIG. 6).

Corresponding to FIG. 4, from the point where the wire exists the sleeve 10, a traction rod runs parallelly thereto.

FIG. 7 shows a embodiment of the arching mechanism, wherein the pressure rods 1' are located at the extreme outer edge of the construction, forming the vertical segments of a frame. The support plate for the pelvic edge is connected via a traction rod with a lever which in turn, starting from its two ends, is connected on the one hand with a first traction-assisting strap and on the other hand, with the sleeve of the traction wire of a bowden wire, whereby the cable engages in a second traction-assisting strap which is mirror-inverted to the first, with respect to the center line of the construction.

FIG. 8 shows an embodiment of the arching mechanism with two parallel, vertical pressure rods, with transverse ribs arranged perpendicularly thereto and with a traction-assisting strap in the vertical median axis of the construction. On this traction-assisting strap, a traction element 2"' is arranged, which is connected with a tension lock 3 actuatable by a hand wheel. The outmost areas of the arching mechanism are connected to two traction springs 4, 4, which are located outside of the pressure rods and parallelly thereto. The parts shown in broken lines show the position of the construction after a bulging. Instead of the tension lock 3', the actuation can also take place over a locking eccenter 17, 17' (FIGS. 8c, 8c').

According to another concept of the invention, the arching mechanism comprises a frame whose vertical crossbars form the pressure elements. The frame is horizontally subdivided in two parts. As shown in FIGS. 9, 9a, 9b, 9c, 9d, 9e, the mutually spaced-apart frame ends are each connected with a lever arm, whereby the respectively neighboring levers are interconnected and linked to traction elements. Furthermore, the ends forming the open areas in the frame are each provided with a sleeve on each side of the frame.

Figure 9A:
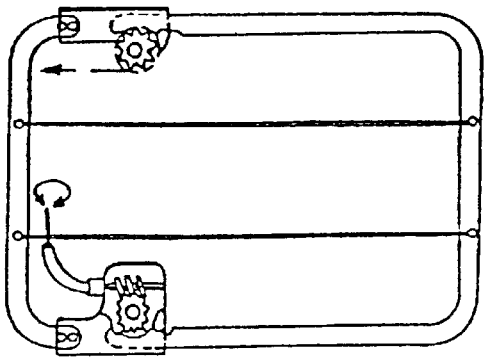
FIGS. 9a and 9e are used showing other actuating systems for the bowing of the device of FIG. 9.
Figure 9B:
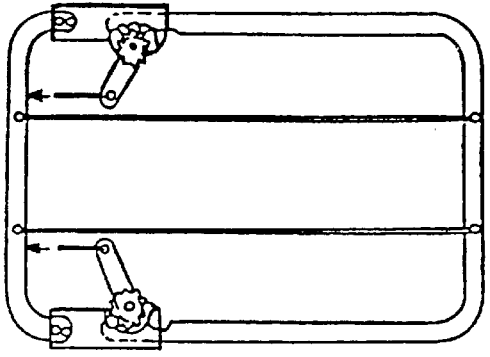
FIG. 9 is an elevational view of a frame structure for a further embodiment of the invention.
Figure 9D:
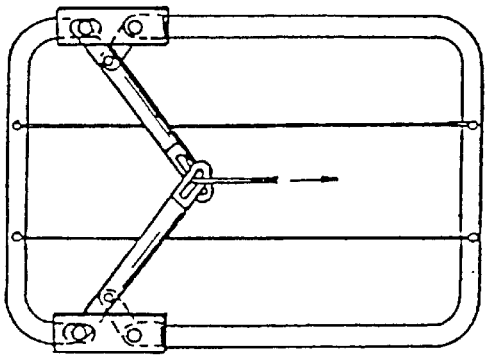
Figure 9E:
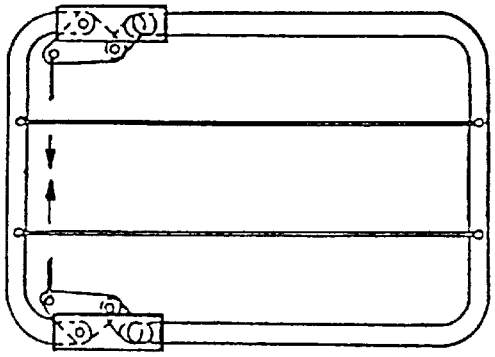
Figure 9:
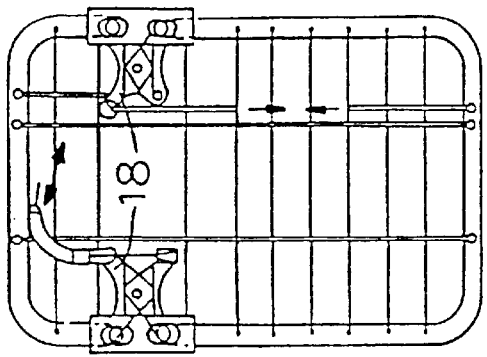
Figure 9C:
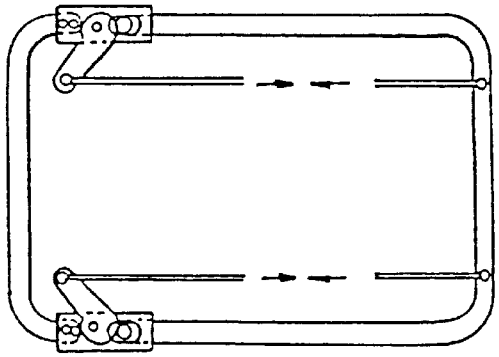

As shown in FIG. 9a, each two neighboring levers are centrally connected to each other, whereby each time the lower lever is connected via a traction element with the upper crossbar of the frame and the two upper levers have a connection with the lower crossbar, wherein an adjusting device not shown in the drawing is interposed as an intermediary link.

When this adjusting device is actuated, the traction elements arch primarily the bulge at the outer edges of a for instance shell-shaped backrest, whereby the pressure elements are subjected to an extension. Instead of pressure rods, it is also possible to use pressure surfaces.

This way, primarily an active bulge of the shell rim is created, whereby inwardly arching transverse ribs (wires, straps, nets) are actively arched in the area wherein also an arching of the shell is supposed to take place, due to the fact that they are entrained on their part, in a fixed or springy manner, together with the two (or several) active arching edges of the shell. The shell shape of a surface remains unimpaired by the intensity of the arching; the shell shape can even be emphasized. For instance, the bulging of a seating surface can be increased, without thereby decreasing the depth of the shell.

FIGS. 10a, b, show a construction wherein the levers engaging at the ends of the divided frame can also lead to an actuation device via a traction element. This arrangement comprises a disk plate centered on the vertical centerline of the construction, which can be rotated by means of a handle. The handle can be fixed in notches (FIG. 10b). The disk plate has two almost circular, decentered, mutually offset recesses, each of them having one traction element leading to the lower area and one traction element leading to the upper area of the frame, this way forming a double eccenter. FIGS. 10' and 10" show the shape of the construction after the bulging process. The device for bulging the construction described in FIG. 10 finds use also in FIG. 11, however here it is centrally inserted in the arching mechanism, whereby from each one recess of the eccenter two traction elements extend to the outer reaches of the frame, symmetrically to the vertical centerline.

The shape achieved after the actuation of the arching device is shown in FIG. 11".

Figure 13:
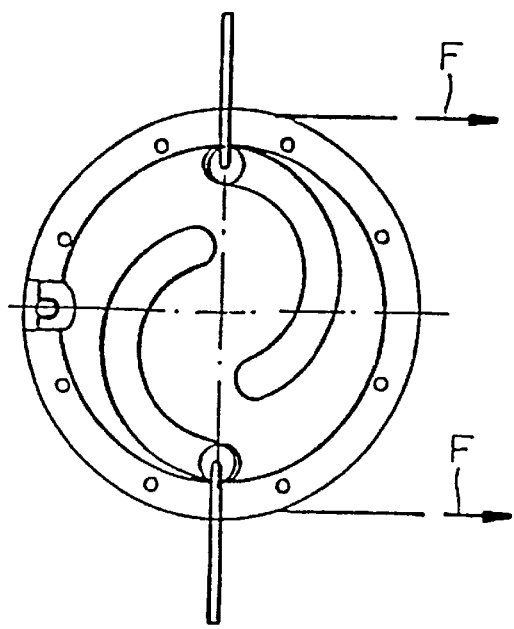
FIG. 13 is a detail of one eccentric arrangement for effecting the bowing.
Figure 14:
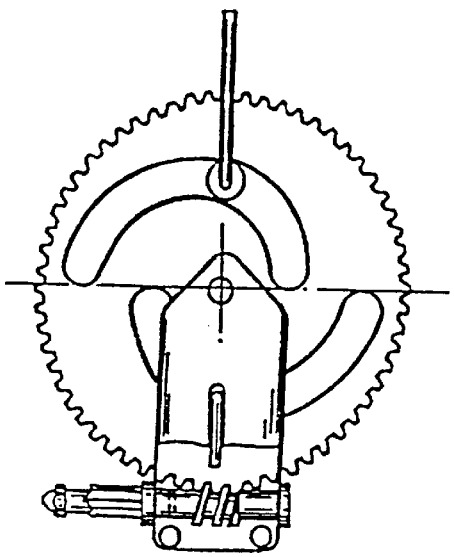
FIG. 14 is an elevational view representing a detail of another eccentric arrangement according to the invention.

The FIGS. 13 and 14 show for instance eccenter disk actuatable via a cable line or a rack-and-pinion combination, whereby the disk itself is designed as a toothed wheel.

Figure 12B:
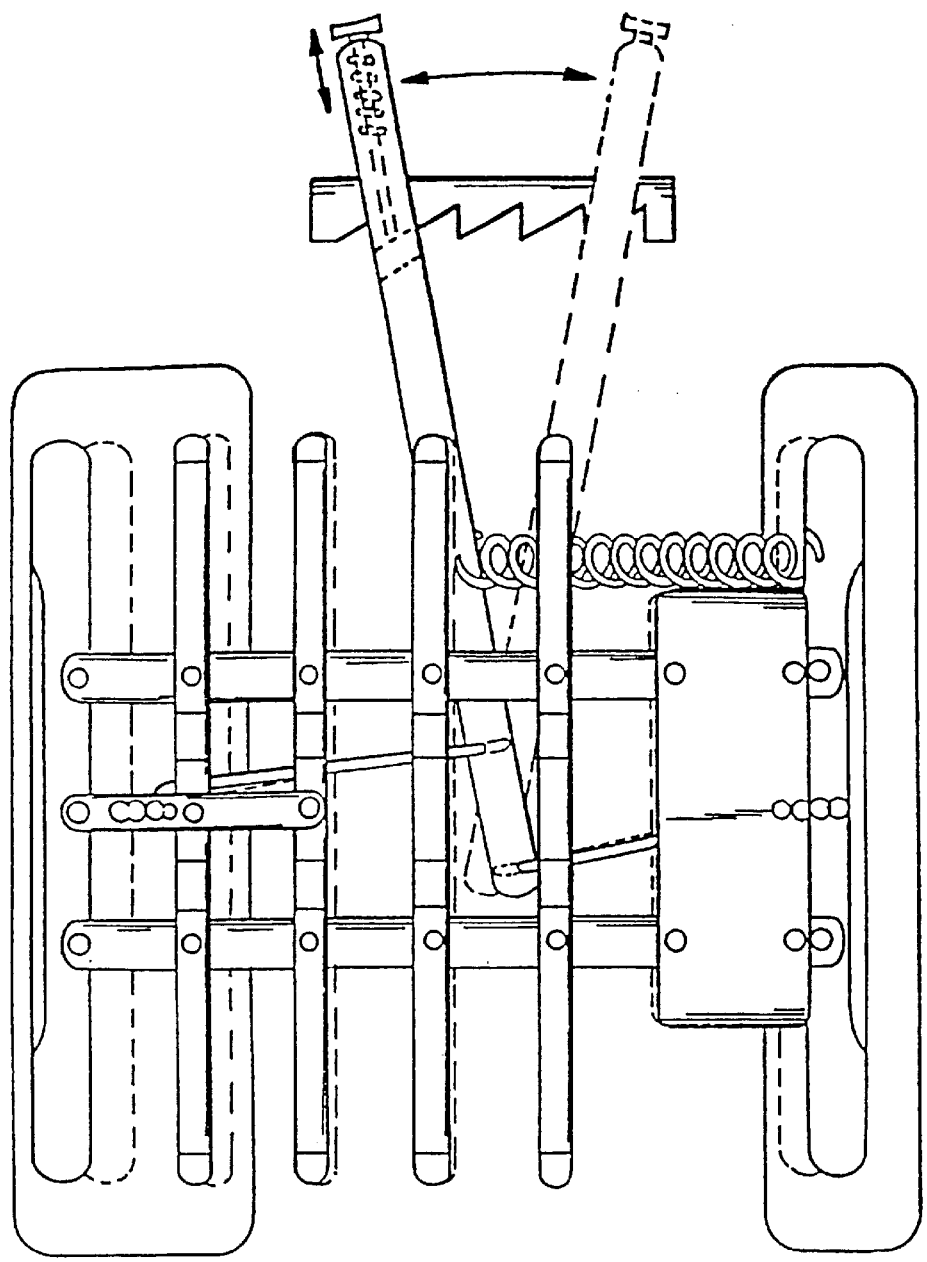
Figure 12A:
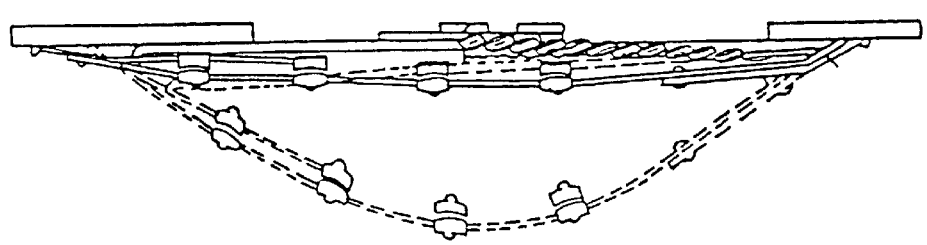
FIG. 12a is a side elevational view of yet a further embodiment showing the bowed state in a broken line.

FIGS. 12a, b show a lever connected to the lower support plate via a spring, which lever is in turn connected via traction elements with the upper, respectively lower regions of the arching mechanism and can be fixed in notches after the corresponding bulging of the backrest (represented in broken lines).

Figure 15:
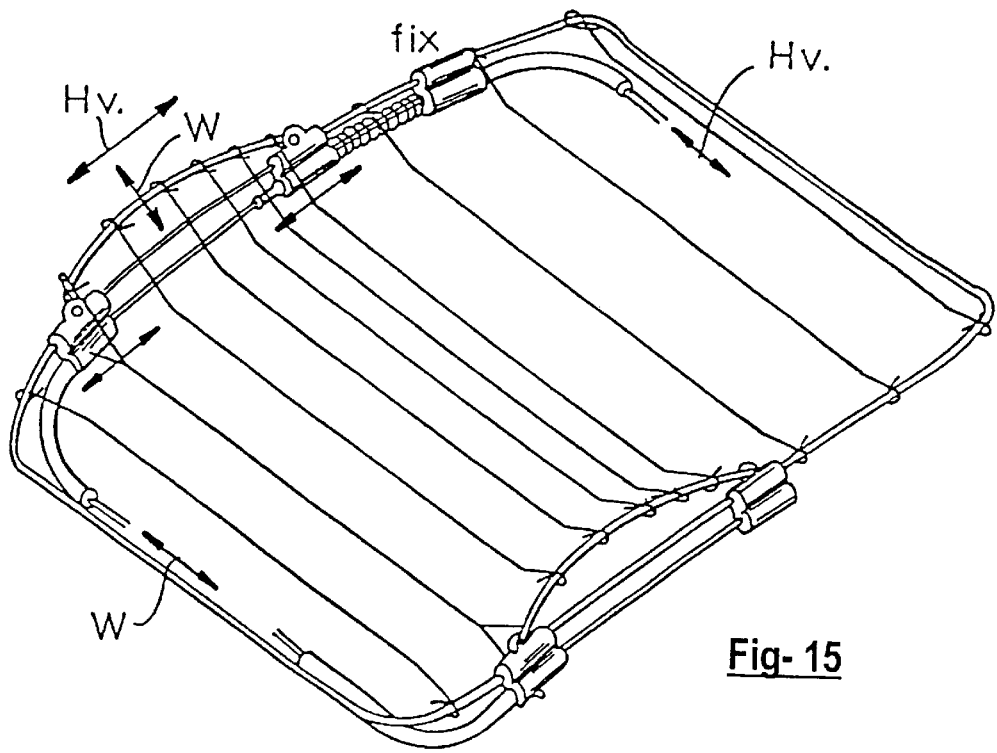
FIG. 15 is a perspective view illustrating the bowing of another arching device according to the invention.

FIG. 15 shows a combined construction, wherein the height as well as the bulge can be simply adjusted, whereby the traction elements marked "W" are responsible for the bulging and the traction elements marked "HV" are responsible for the height adjustment.

Figure 1:
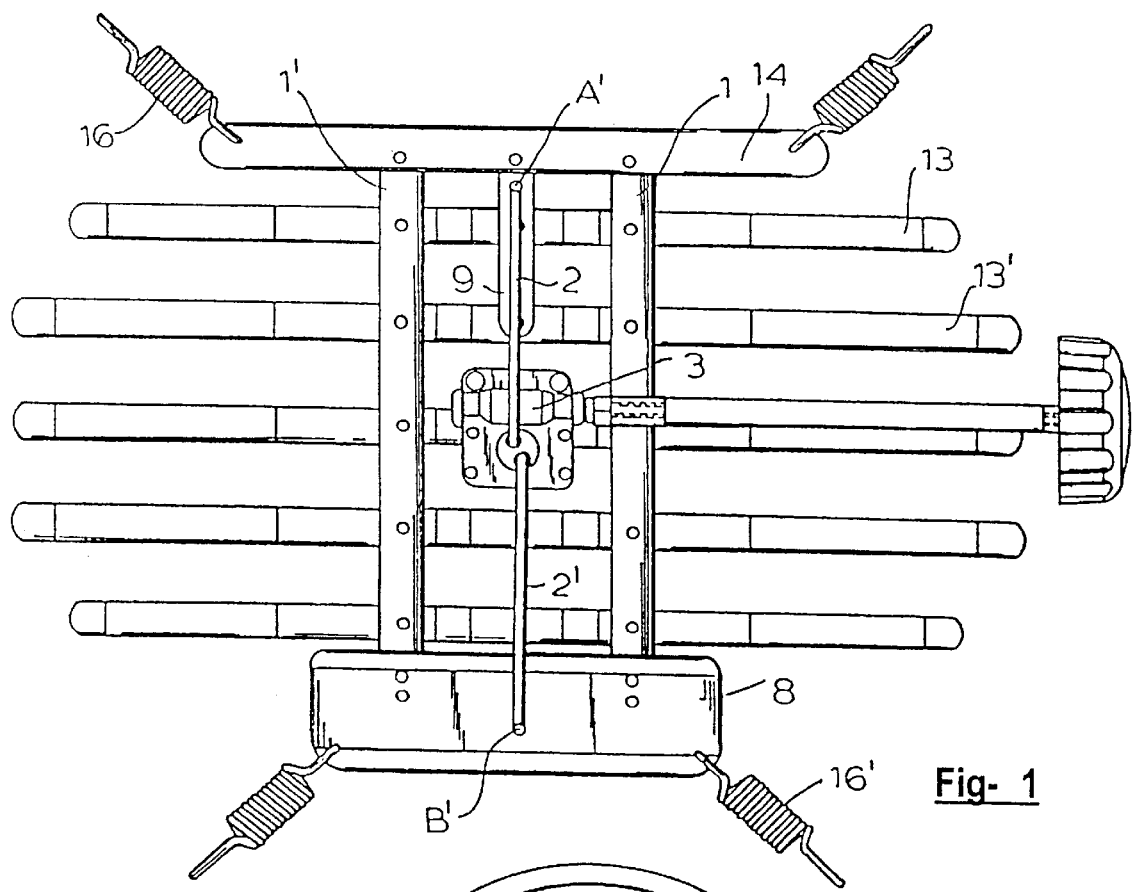
FIG. 1 is an elevational view of an arching mechanism according to one embodiment of the invention.
Figure 16:
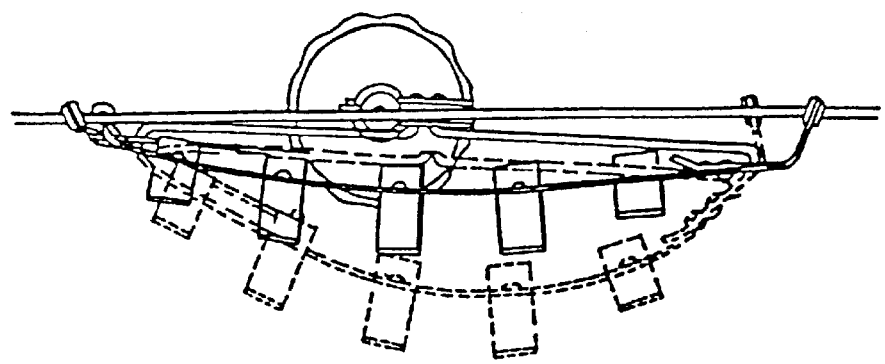
FIGS. 16, 16' are elevational views illustrating still another embodiment of the invention.
Figure 16:
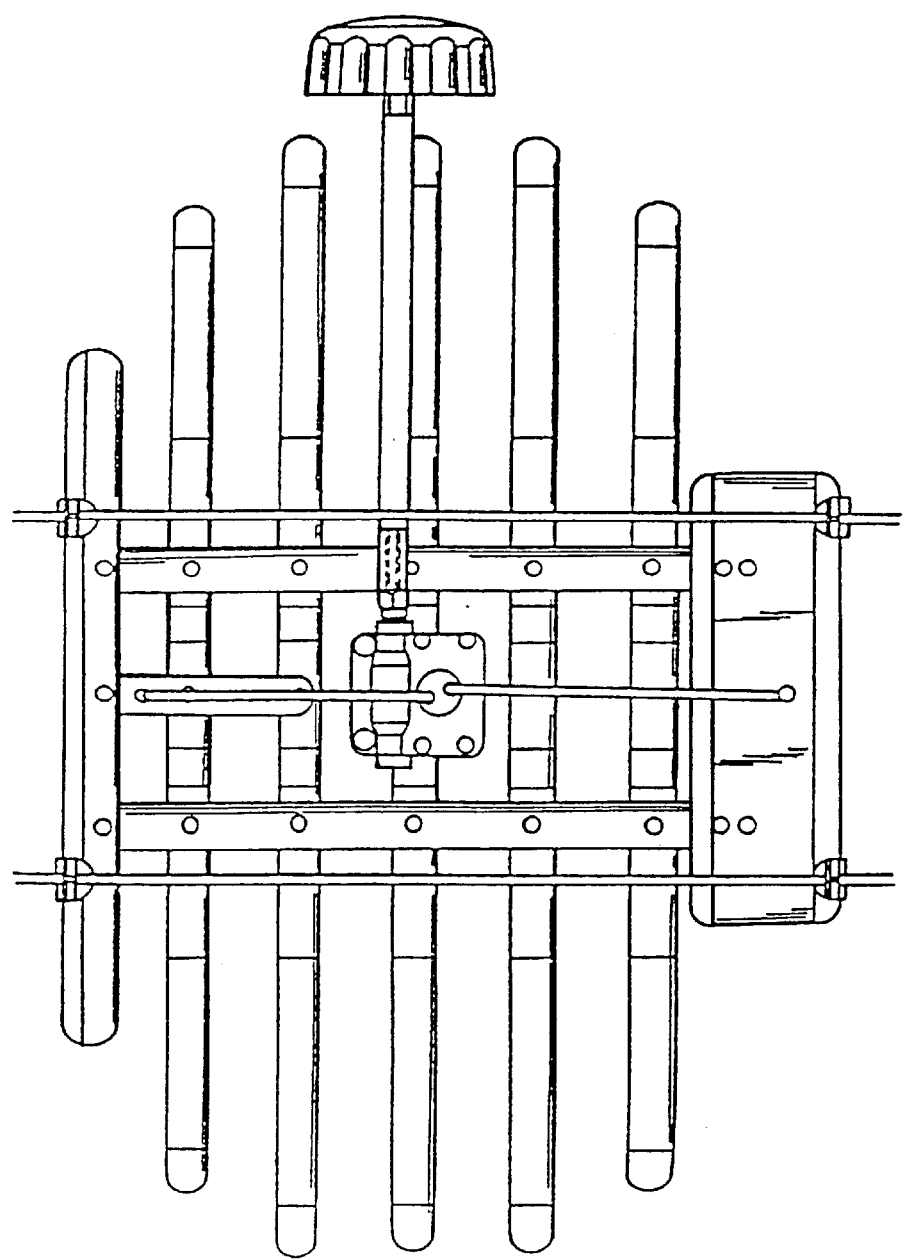
Figure 17:
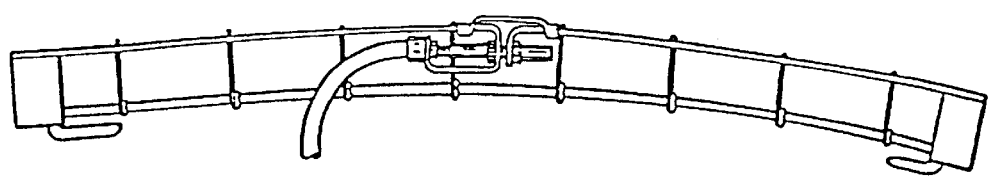

FIG. 16 shows an embodiment of the arching mechanism basically identical to the one of FIG. 1, wherein however during bulging the entire mechanism slides along two rods symmetrically arranged with respect to the vertical median axis.

Figure 18:
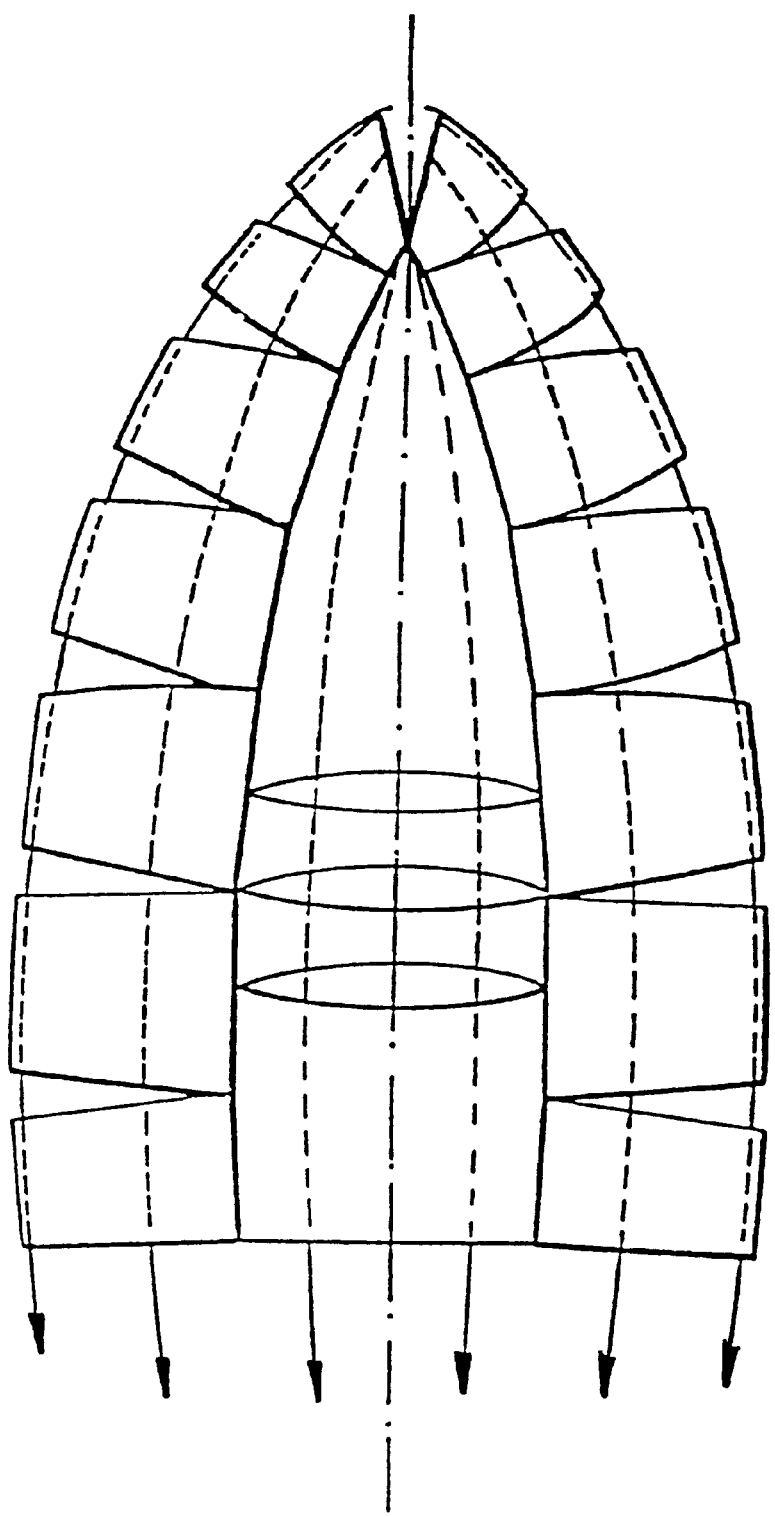
FIG. 18 is an elevational view diagrammatically illustrating a segmental instruction of the pressure elements which can be used in the embodiments previously described or subsequently described.

The arching mechanism shown in FIGS. 1 to 24 can have further pressure elements (rods, surfaces, gratings, etc), which can be bulged in different directions, by providing for instance in one or several points interruptions (open portions, overlappings) or locking straps or areas similar to bellows (FIG. 18).

During traction, the traction elements used in such constructions, which either traverse the pressure elements or bypass them (possibly with interposed spacers), due to the tension of one or several tension mechanisms close the open, respectively overlapping interstices, respectively areas designed like bellows in the pressure elements, in steps or continuously. When using locking straps or other suitable means, the reinforced areas are in any case subject to either reduced or intensified bulging. During to this aforementioned partial or complete closing of the open portions or folds, a bulging occurs with respect to the areas of the pressure elements which are not interrupted or designed like bellows also in the direction transverse to the traction elements. Traditionally, a bulging surface can be arched only approximately parallelly to or in the direction of the pressure element(s). Due to this "multidimensionally" bulging construction, it is possible to obtain even spherical or the like surfaces by closing the opposite open ends of a flat or slightly curved surface.

Such a construction type can be of use for instance in construction for casing elements or in navel construction. The surface to be bulged, for instance, can already be curved in advance by spring force and can be then made to bulge in the same or in the opposite direction, by slightly actuating the tension device. As a tension device for the arching mechanism according to the invention, it is possible to use also a simple cable winch, coil or bobbin, which can also serve for larger length changes in the traction, respectively pressure elements.

It is also possible to use several arching mechanisms, whereby their effects can be compounded or annihilate each other, so that for instance one or several additional bulges in an already existing bulge can be achieved.

Figure 19:
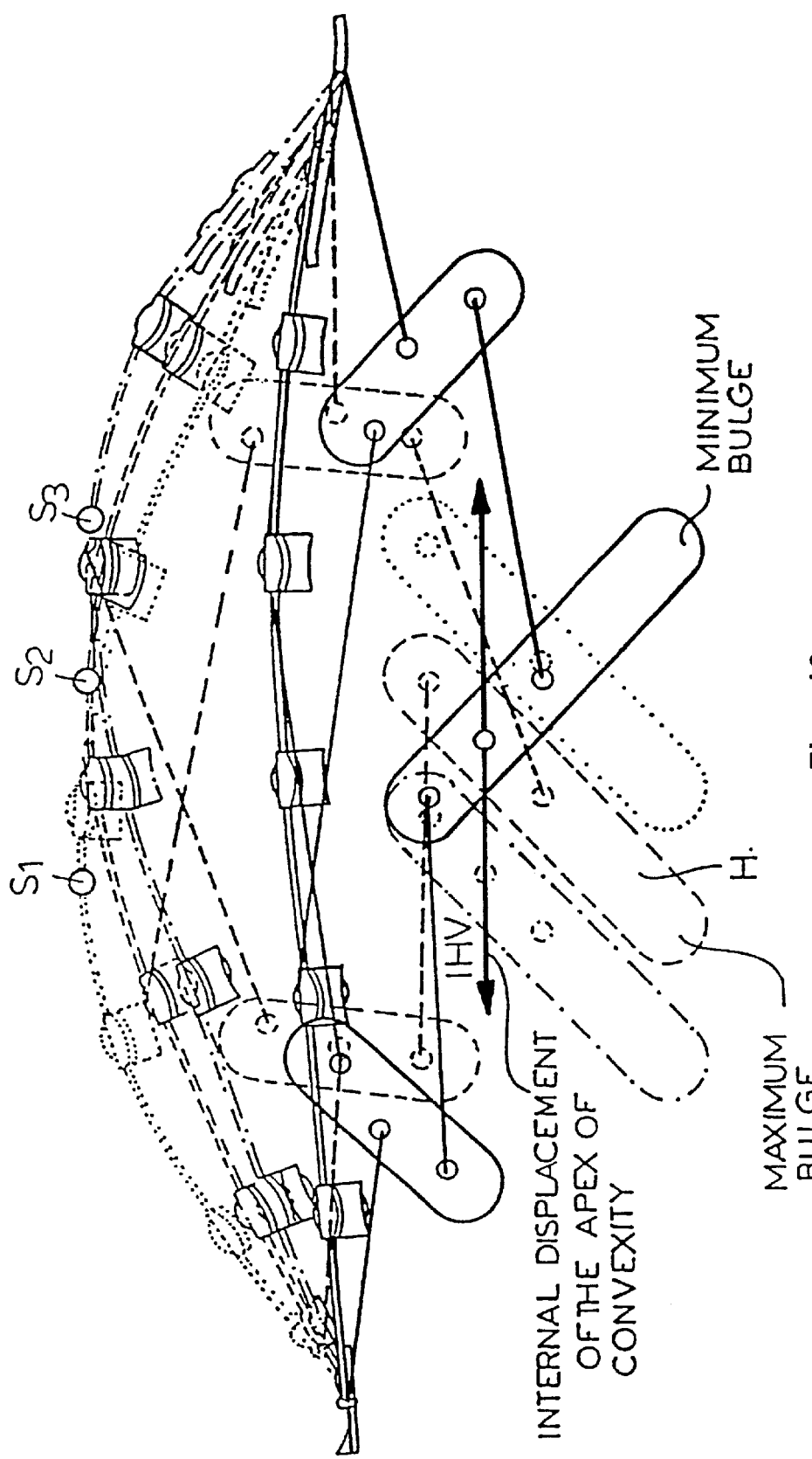
FIG. 19 is a diagram illustrating the principle of the invention utilized in effecting bowing of various embodiments.

In this type of construction it is possible that—no matter which of the cooperating arching mechanisms are individually involved and in which way—when the main traction element is relaxed all the individual arching units arranged to work together, against each other or overlappingly, as well as the entire arching mechanism can be set to zero or to an intermediate or extreme value, and that when another arching process is started, only that part of the arching mechanism participates in the bulging, which according to the set slits, control levers, eccenters, etc and their lost motion areas (slits or other free spaces of the traction or pressure elements or of their articulations, stops, etc) are supposed to be actively arched (e.g. FIG. 19).

In the embodiment of the arching mechanism represented in this figure, it is possible to obtain any shape, from a minimal to a maximal bulge, depending on the position of the lever H (in broken lines or in strongly extended position). Depending on the positioning of the lever H along the line IHV provided with direction arrows, an internal displacement of the apex of the convexity can take place (positions S1, S2, S3).

FIG. 20 shows a similar embodiment, wherein the variable arching possibility of the arching mechanism and the internal height adjustment occur via a bowden wire, linear motor and modular system.

The arching mechanisms mentioned in the specification or also individual elements thereof can be manufactured in a construction assembly, respectively modular system and can be quickly assembled, replaced, repaired, and varied, respectively combined with any heretofore-known or future components or construction elements by using adequate connection elements, e.g. elements like bicycle spokes with heads insertable in correspondingly shaped bayonet-type fittings or the like or other plug, clip or clamp connections, etc. This modular contraction type makes possible an individualized production of the mechanism, since all elements of the invention are selectively interchangeable with one another or can be integrated with already existing foreign elements (e.g. when the mechanism is built into an already existing seat or another construction element). The arching mechanisms according to the invention can replace the heretofore-used arching mechanisms or can be arranged in addition to the latter in selected angular positions or parallelly in any desired combination.

The arching can be performed mechanically, electrically, pneumatically, and so on, directly or by remote control, and namely so that the apex of convexity can be height-adjusted at will or can be produced within the construction at will.

Figure 21:
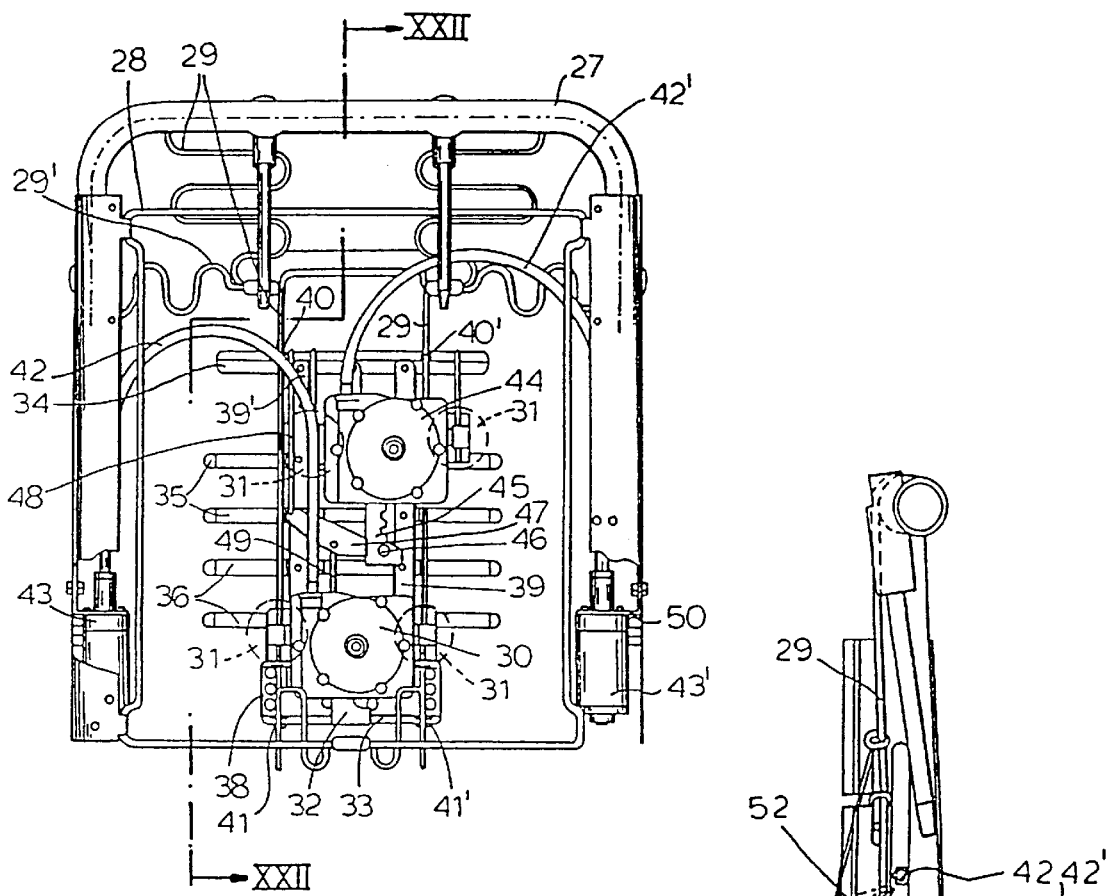
FIG. 21 is an elevational view of yet another embodiment of the invention.

FIG. 21 shows an embodiment wherein the arching mechanism has been integrated in a backrest.

The backrest consists for instance or a U-shaped downwardly open frame 27 and a frame crosstie 28. Inside this U-shaped frame, there are two vertically running tension wires 29, fastened to the frame. As shown in FIG. 21, these tension wires can be shaped for instance meander-like in their upper portion. Also in the upper portion of the tension wires, a further tension wire 29' runs horizontally through the backrest. In the lower portion of the two tension wires 29, which is basically rectilinear (but can also be offset to accommodate the gearing), a first gearing 30 is provided, which can be mounted by means of clamp elements 31. The first gearing 30 has a worm, a wormwheel and a pinion (all not shown in the drawing) connected to displace the first toothed rack 32. The toothed rack 32 is traversed in its lower area by a transverse shaft 33. The gearing has a high transmission ratio, and thus the adjustment of the support can be effected with small forces and low torque. The pressure element is received by the tension wires 29, which also serve as slide wires, i.e. the pressure element is slidably arranged thereon.

The general pressure element is advantageously composed of an upper end strip 34, mutually spaced-apart transverse ribs 35, 36, 37 and a support plate 38 preferably arranged in the lower area of the backrest for the support of the pelvic edge of the spinal column, in this order. These elements are connected by at least two pressure strips 39 which are parallel to the tension wires. The upper end strip and the support plate are each slidably arranged on the tension wires by means of two slide eyes 40, 40' and 41, 41'.

The first gearing 30 is connected via a flexible shaft 42 with an electromotor 43, arranged for instance in the lower area of the backrest. When the first gearing 30 is actuated, a height adjustment of the general pressure element takes place. On the upper end strip 34, a second gearing 44 is arranged, which equivalently to the first gearing 30, is in working connection with a second toothed rack 45 via a high transmission rate. This gearing is also driven by an electromotor 43' via a flexible shaft 42'. This second gearing is rigidly mounted to the upper area of the general pressure element. Preferably, the two gearing are of identical construction and due to the reduced forces involved can be made of plastic material. Preferably, the two gearings fastened by clamp elements 31 to the tension wires 29 can be simply mounted or dismounted. The two gearings are preferably made of plastic material, molded material, diecast metal or sheet metal.

The general pressure element does not necessarily have to be built in the manner described above, for instance it can be made of one or several bulging plates of any pressure-resistant but flexible material, which again can be closed, perforated or grid-like or with a thickness and resistance which caries in certain portions thereof, in order to make possible the formation of different or identical curvatures in different areas.

In this embodiment, a triangular rocker lever 47 is articulated to the second toothed rack 45 by a pivot pin 46. The rocker lever has two bores, for instance one in its center and the other one in its end remote from the pivot pin. The left bore of the rocker lever shown in FIG. 21 is connected via rigid spoke 48 with the upper end strip 34 and over a further spoke 49 with the support plate 38.

When the second toothed rack is actuated, a curving of the pressure element occurs, since the distance between the support plate an the upper end strip has to change, but the spokes remain rigid. Depending on the curvature, the apex thereof wanders upwardly or downwardly. The position of the rocker lever (from slightly upwardly inclined to slightly downwardly inclined) depends on the selected degree of bulging of the support.

Depending on the placement of the intermediate bore of the rocker lever, differing transmission ratios can be created. By modifying the length of the second toothed rack, the fulcrum formed by the pivot pin is entrained. If the distance of the bores is equally big, the spoke will complete only half the stroke compared to the second toothed rack (halved force equals double stroke).

Since the arching mechanism slides along the tension wires by means of four eyes, which can also be replaced by slide rings, it has proven particularly advantageous to use snap elements for this purpose, for instance open, especially U-shaped elements which narrow down towards the opening.

This way, the entire construction can be treated as a module and can be replaced or mounted in seconds, during mounting or necessary repairs. The motors 43, 43' are advantageously mounted on the frame by means of fastening brackets 50.

Figure 22:
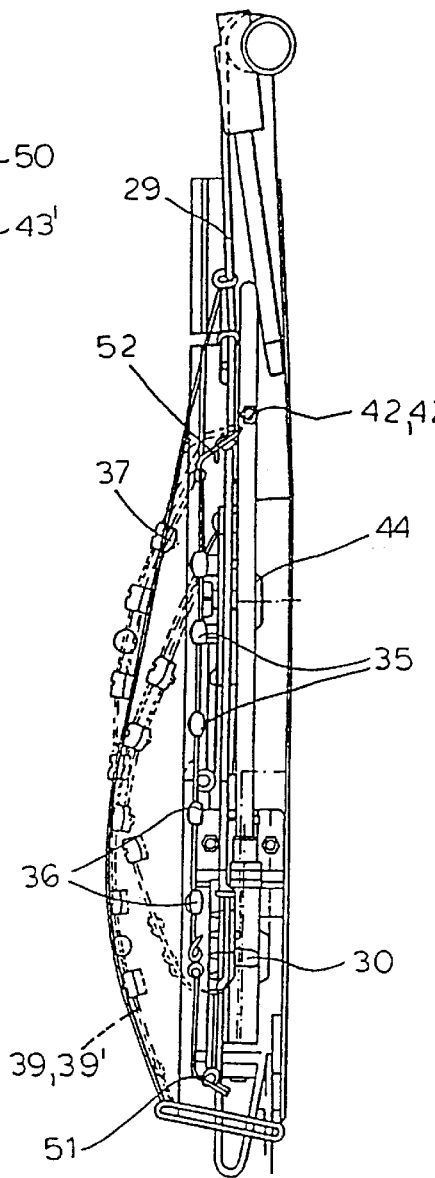
FIG. 22 is a sectional taken along the line AA of FIG. 21.

All or some of the individual elements "under tension" of the construction are kept at a distance with respect to the general pressure element (or parts thereof) either for instance by the offset ends (51, 52) of the general pressure element, as can be seen from FIG. 22 which is a section along the line A—A in FIG. 21, or by separate spacing elements, respectively construction elements, or by a slight prestressing of the traction elements, etc., which determines the direction of bulging. Further, an embodiment with a common drive is also conceivable.

Figure 23:
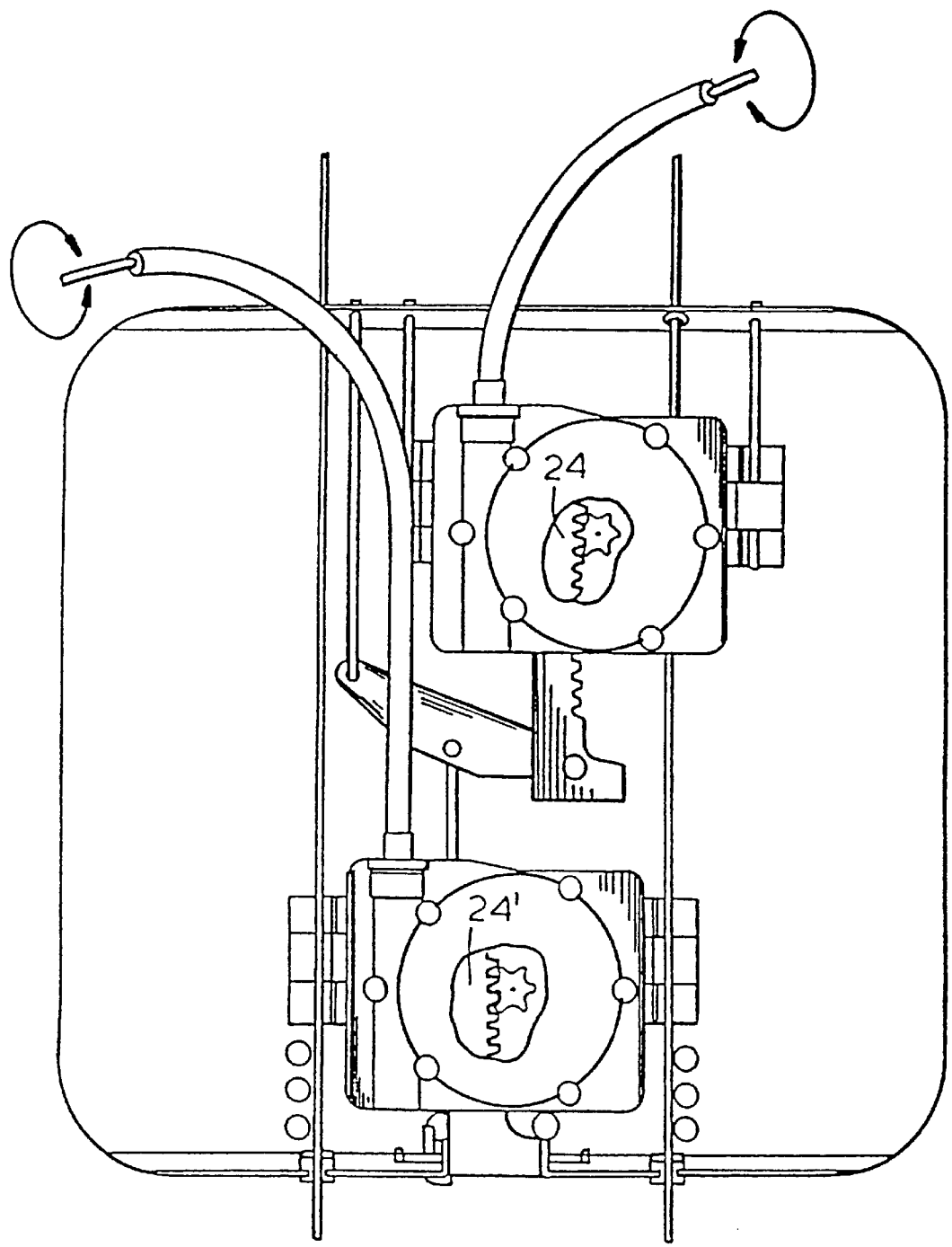
FIG. 23 is a elevational view of yet another mechanism for effecting bowing of an arching mechanism according to the invention.

A general representation of this variant can be found in FIG. 23.

A further embodiment, similar to the one shown in FIG. 21 is shown in FIG. 24. The drive of the arching mechanism takes place here over bowden wires 53 and two linear motors 54, 54'. The linear motor 54 arranged in the figure to the right serves for the direct, respectively indirect control of the bulge.

A direct bulge control takes place then when the bowden wire engages directly at the arching mechanism. The control shown in the drawing figure which takes place via the transmission rocker lever 55 is an indirect control. This can also take place via guide rollers, curves, etc.

The control shown in the figure to the left represents a double-acting linear drive 54', which on one side retracts the bowden control cable 53' and on the opposite side relaxes the same cable. This way for instance the height adjustment of the pressure element along the tension or slide wires can be performed, but it can also be achieved on or in slide rails, in or on slide surfaces, in shell bodies or directly in free space, suspended on or hanging from one or several bowden wires.

The bowden-wire sleeve 56 guiding the bowden control cable 53' is attached on top and bottom to the guide wire by means of a suspended eyelet spoke or directly to the frame (in points D, F, G). The movable bowden control cable or any other traction or control cable can now be clamped at selected points by means of one or several snap or screw connections and fastened at a selected point (in this figure marked with the possibilities A, B and C) via a control lever, or also over rods, or a cable winch, a thrust linkage, whereby at the displacement of the wire inside the bowden control wire or one of the aforementioned devices, the arching mechanism is synchronously moved together with the wire displacement. If the connection is made at the uppermost point (A) of the arching mechanism, during bulging, due to the shortening of the entire bulging surface, the apex of the convexity also wanders upwardly exactly with the same percentage corresponding to the relation of the lengths between the upper edge and the apex, as well as the lower edge and the apex.

First of all, this can be very important from the medical point of view, since in the base of a bulging for the "small-of-the-back arched position" the person is also somewhat stretched.

If the fastening is done at the apex, the apex of convexity remains constant for instance with respect to the seat. In the case of a connection at the lowermost point of the mechanism (C), during bulging the total length reduction resulting from arching becomes effective only at the uppermost end of the arching mechanism, and all other points, as well as the apex of convexity are displaced downwardly, in correspondence only to a percentage relation to the various length of the individual halves of the arching mechanism.

Naturally, the apex of convexity remains here unchanged, considered with respect to the person, since the person becomes somewhat shorter when the spinal column is bent (the last mentioned embodiment suits this case) and the lordosis sinks thereby slightly downwardly.

Thus, each way of fastening depends primarily on the fact whether it is intended to synchronize the motion with the person. In an active back support, the apex of the convexity must be fixed. Then, the person can find full support in the heightwise resting apex, when getting shorter due to the arched back position. This way, the arching mechanism and not the spinal column bears the weight of the upper body.

Further, it is conceivable to have a trailing of a forerunning phase shift between the fixed apex of the lordosis and the apex of the arching mechanism, i.e. an overcompensation, respectively undercompensation of the apex takes place.

It is self-understood that the arching mechanism can be used in addition to other constructions or integrated in such constructions (for instance attaching the mechanism to an already existing backrest). Further, it should also be pointed out that the mechanism or elements thereof can be in connection with a memory, whereby bulging and apex position can be programmed and can be brought automatically in the selected position with the use of chips, magnetic cards, keys, etc. or the desired (required) bulge height, respectively apex point displacement can be set mechanically, e.g. with the aid of a four-way switch (tumbler).

As a result of this embodiment of the arching mechanism, wherein the control unit is clamped with the bowden control wire and it is possible to select at will the application point of this unit on the mechanism, preexisting conditions of the edges, such as hard or soft upholstery, various desired suspensions of the mechanism in a preexisting frame, etc. can be simply taken into consideration in my desired way, without jeopardizing the operation of the arching mechanism.

It is not only possible to over- or undercompensate the movements, but also to take into consideration the respective seat constructions, upholstery materials, covers, suspensions, and so on.

The arching mechanism of the invention, described above with reference to backrests, can of course be applied to many other fields, such as medical or sports apparatus, toys, life-saving equipment, for various protective and carrying constructions, and so on.

What is claimed is:

1. A lumbar support for a back of a seat, comprising:
   a flexible structure including first and second end portions; and
   a traction device comprising:
   a bowden cable having a wire anchored to one of said end portions and a sleeve anchored to said lumbar support and through which said wire is guided; and
   a mechanism connected to said wire for tensioning said wire to draw one of said first and second end portions toward the other of said first and second end portions thereby controllably arching said flexible structure.

2. A lumbar support for a back of a seat, comprising:
   an upper section and a lower section spaced below said upper section;
   a flexible structure connecting said upper and lower sections and adapted to bow upon displacement of at least one of said sections toward the other, thereby forming a curvature in said flexible structure; and
   a bowden cable having a wire anchored to said lower section and a sleeve anchored to the upper section of said lumbar support and through which said wire is guided; and
   a mechanism connected to said wire for tensioning said wire to draw one of said upper section and said lower section toward the other of said upper section and said lower section, thereby controllably arching said flexible structure.

3. A lumbar support for a back of a seat, comprising:
   an upper section and a lower section spaced below said upper section;
   a flexible vertical structure connecting said upper and lower sections and adapted to bow upon displacement of at least one of said sections toward the other thereby forming a curvature in said flexible vertical structure; and
   a bowden cable having a wire anchored to an upper portion of said lumbar support and a sleeve anchored to a lower portion of said lumbar support and through which said wire is guided; and
   a mechanism connected to said wire for tensioning said wire to draw one of said upper portion of said lumbar support and said lower portion of said lumbar support toward the other of said upper portion of said lumbar support and said lower portion of said lumbar support, thereby controllably arching said flexible vertical structure.

4. A lumbar support for a back of a seat, comprising:
   a flexible structure including opposite end portions;
   a bowden cable having a wire anchored to one of said end portions and a sleeve anchored to the other of said end portions and through which said wire is guided;
   a spring operatively connecting one of said end portions to said wire or said sleeve; and
   a mechanism connected to said wire for tensioning said wire to draw one of said end portions toward the other of said end portions to selectively increase an arch of said flexible structure.

5. A lumbar support for a back of a seat, comprising:
   a flexible structure including a first end and a second end;
   a bowden cable having a wire and a sleeve through which said wire is guided, said wire anchored to said flexible structure, a spring operatively connecting said sleeve to said flexible structure; and
   a mechanism connected to said wire for tensioning said wire to draw said first end toward said second end to selectively arch said flexible structure.

6. The lumbar support of claim 5 further including a spring operatively connecting said flexible structure to at least one of said wire or said sleeve.

7. A lumbar support for a back of a seat, comprising:
   an upper member and a lower member spaced below said upper member;
   a flexible structure including first and second end portions; and
   a traction device comprising:
   a bowden cable having a wire anchored to one of said end portions and a sleeve anchored to said lumbar support and through which said wire is guided; and
   a mechanism connected to said wire for tensioning said wire to draw one of said first and second end portions toward the other of said first and second end portions thereby increasing an arch of said flexible structure.

8. The lumbar support of claim 7 further including a spring operatively connecting said flexible structure to said sleeve.

* * * * *